United States Patent
Mertinooke et al.

(10) Patent No.: US 10,676,985 B2
(45) Date of Patent: Jun. 9, 2020

(54) LOW COMPRESSION-FORCE TPE WEATHERSEALS

(71) Applicant: Amesbury Group, Inc., Amesbury, MA (US)

(72) Inventors: Peter Mertinooke, Amesbury, MA (US); John Huntress, Amesbury, MA (US)

(73) Assignee: Amesbury Group, Inc., Amesbury, MA (US)

( * ) Notice: Subject to any disclaimer, the term of this patent is extended or adjusted under 35 U.S.C. 154(b) by 0 days.

(21) Appl. No.: 16/042,030

(22) Filed: Jul. 23, 2018

(65) Prior Publication Data

US 2018/0328103 A1 Nov. 15, 2018

Related U.S. Application Data

(63) Continuation of application No. 15/043,298, filed on Feb. 12, 2016, now Pat. No. 10,329,834.

(60) Provisional application No. 62/116,105, filed on Feb. 13, 2015.

(51) Int. Cl.
*E06B 7/22* (2006.01)
*E06B 7/23* (2006.01)
*B29C 48/12* (2019.01)
*B29C 48/00* (2019.01)

(52) U.S. Cl.
CPC ............ *E06B 7/2314* (2013.01); *B29C 48/12* (2019.02); *E06B 7/2301* (2013.01); *E06B 7/2309* (2013.01); *B29C 48/0012* (2019.02); *B29C 48/0022* (2019.02)

(58) Field of Classification Search
CPC .... E06B 7/2314; E06B 7/2301; E06B 7/2309; B29C 48/12; B29C 48/0012
USPC .................................. 49/480.1, 489.1, 498.1
See application file for complete search history.

(56) References Cited

U.S. PATENT DOCUMENTS

| | | | |
|---|---|---|---|
| 343,345 A | 6/1886 | Sparks |
| 874,938 A | 12/1907 | Cazin |
| 1,312,034 A | 8/1919 | Jones |
| 1,776,073 A | 9/1930 | Girard |
| 1,805,145 A | 5/1931 | Koops |
| 1,826,297 A | 10/1931 | Apple |

(Continued)

FOREIGN PATENT DOCUMENTS

| | | |
|---|---|---|
| CA | 852096 | 9/1970 |
| CA | 1177212 | 11/1984 |

(Continued)

OTHER PUBLICATIONS

PCT International Search Report and Written Opinion in International Application PCT/US2016/017801, dated May 2, 2016, 14 pages.

(Continued)

*Primary Examiner* — Jerry E Redman

(57) ABSTRACT

A weatherseal has a stiffener and a foam profile. A first portion of the foam profile is connected to the stiffener. A second portion of the foam profile is joined to the first portion at a hinge. The first and second foam profile portions have inner surfaces facing substantially towards each other and outer surfaces facing substantially away from each other. The foam profile defines at least one continuous elongate lumen. A portion of the foam profile has a resin coating.

20 Claims, 28 Drawing Sheets

(56) References Cited

U.S. PATENT DOCUMENTS

| | | |
|---|---|---|
| 1,943,818 A | 1/1934 | Fantone |
| 1,960,137 A | 5/1934 | Brown |
| 1,960,997 A | 5/1934 | Halloran |
| 2,012,625 A | 8/1935 | Calcutt |
| 2,115,368 A | 4/1938 | Lustberg |
| 2,127,413 A | 8/1938 | Leguillon |
| 2,138,699 A | 11/1938 | Hinze |
| 2,175,099 A | 10/1939 | Abbott |
| 2,199,067 A | 4/1940 | Brandt |
| 2,200,933 A | 5/1940 | Nystrom |
| 2,218,482 A | 10/1940 | Reevely |
| 2,280,105 A | 4/1942 | Larmuth |
| 2,293,252 A | 8/1942 | Foster |
| 2,314,168 A | 3/1943 | Smith |
| 2,341,450 A | 2/1944 | Knaus |
| 2,354,426 A | 7/1944 | Briant |
| 2,366,077 A | 12/1944 | Wildy et al. |
| 2,386,995 A | 10/1945 | Wigal |
| 2,390,780 A | 12/1945 | Cornwell |
| 2,415,721 A | 2/1947 | Arner |
| 2,459,120 A | 1/1949 | Sparagen |
| 2,550,520 A | 4/1951 | Bennett |
| 2,555,380 A | 6/1951 | Stuart et al. |
| 2,602,959 A | 7/1952 | Fenlin |
| 2,623,444 A | 12/1952 | Maier et al. |
| 2,626,426 A | 1/1953 | Stahl |
| 2,657,414 A | 11/1953 | Miller et al. |
| 2,677,633 A | 5/1954 | Gross |
| 2,695,421 A | 11/1954 | Amundson et al. |
| 2,724,877 A | 11/1955 | Ramsay |
| 2,726,632 A | 12/1955 | Asbeck et al. |
| 2,748,044 A | 5/1956 | Seller |
| 2,754,543 A | 7/1956 | Loew |
| 2,757,709 A | 8/1956 | Crabbe et al. |
| 2,761,417 A | 9/1956 | Russell et al. |
| 2,761,418 A | 9/1956 | Russell |
| 2,761,791 A | 9/1956 | Russell |
| 2,778,059 A | 1/1957 | Henning et al. |
| 2,786,622 A | 3/1957 | Ross et al. |
| 2,797,443 A | 7/1957 | Carlson |
| 2,821,497 A | 1/1958 | Works et al. |
| 2,838,813 A | 6/1958 | Naramore |
| 2,839,796 A | 6/1958 | Quoss |
| 2,868,159 A | 1/1959 | Lit et al. |
| 2,880,698 A | 4/1959 | Olson |
| 2,911,382 A | 11/1959 | Barkhnff et al. |
| 2,874,752 A | 12/1959 | Brey |
| 2,933,782 A | 4/1960 | Cornell |
| 2,933,784 A | 4/1960 | Hooverson |
| 2,952,240 A | 9/1960 | Abbott |
| 2,977,632 A | 4/1961 | Bunch |
| 3,029,779 A | 4/1962 | Hornbostel |
| 3,032,008 A | 5/1962 | Land et al. |
| 3,032,812 A | 5/1962 | Van Riper |
| 3,041,681 A | 6/1962 | Goodwin |
| 3,041,682 A | 6/1962 | Alderfer et al. |
| 3,075,653 A | 1/1963 | Wales et al. |
| 3,081,213 A | 3/1963 | Chinn |
| 3,155,540 A | 11/1964 | Loeffler et al. |
| 3,155,543 A | 11/1964 | Marzocchi et al. |
| 3,167,827 A | 2/1965 | Alley et al. |
| 3,184,808 A | 5/1965 | Lyon |
| 3,184,811 A | 5/1965 | Bennett et al. |
| 3,206,323 A | 9/1965 | Miller et al. |
| 3,227,577 A | 1/1966 | Baessler et al. |
| 3,238,573 A | 3/1966 | Pease, Jr. |
| 3,251,911 A | 5/1966 | Hansen |
| 3,287,477 A | 11/1966 | Vesilind |
| 3,309,439 A | 3/1967 | Nonweiler |
| 3,350,248 A | 10/1967 | Demarest, Jr. et al. |
| 3,378,956 A | 4/1968 | Parks et al. |
| 3,385,001 A | 5/1968 | Bordner |
| 3,407,253 A | 10/1968 | Yoshimura et al. |
| 3,412,709 A | 11/1968 | Goyffon |
| 3,420,208 A | 1/1969 | Guthrie |
| 3,424,130 A | 1/1969 | Byrnes et al. |
| 3,448,543 A | 6/1969 | Multer |
| 3,450,098 A | 6/1969 | Williams |
| 3,469,349 A | 9/1969 | Multer |
| 3,471,898 A | 10/1969 | Krystof |
| 3,473,512 A | 10/1969 | Wood |
| 3,482,006 A | 12/1969 | Carlson |
| 3,531,829 A | 10/1970 | Skobel et al. |
| 3,535,824 A | 10/1970 | Kessler |
| 3,564,773 A | 2/1971 | Bonnaud |
| 3,595,204 A | 7/1971 | McIntyre |
| 3,596,432 A | 8/1971 | Straub et al. |
| 3,624,964 A | 12/1971 | Bordner et al. |
| 3,635,620 A | 1/1972 | Brown |
| 3,669,062 A | 6/1972 | Kallianides et al. |
| 3,672,974 A | 6/1972 | Tomlinson |
| 3,685,206 A | 8/1972 | Kessler |
| 3,700,368 A | 10/1972 | Wells |
| 3,700,486 A | 10/1972 | Veltri et al. |
| 3,733,660 A | 5/1973 | Kallianides et al. |
| 3,737,490 A | 6/1973 | Nicholson |
| 3,755,873 A | 9/1973 | Lansing |
| 3,762,100 A | 10/1973 | Kempel |
| 3,767,454 A | 10/1973 | Franke, Jr. et al. |
| 3,781,390 A | 12/1973 | Wells |
| 3,782,870 A | 1/1974 | Schippers |
| 3,789,099 A | 1/1974 | Garrett et al. |
| 3,811,989 A | 5/1974 | Hearn |
| 3,813,199 A | 5/1974 | Friesner |
| 3,814,779 A | 6/1974 | Wiley |
| 3,815,637 A | 6/1974 | Carrow |
| 3,827,841 A | 8/1974 | Kawai et al. |
| 3,836,297 A | 9/1974 | Weaver |
| 3,840,384 A | 10/1974 | Reade et al. |
| 3,841,807 A | 10/1974 | Weaver |
| 3,842,564 A | 10/1974 | Brown |
| 3,843,475 A | 10/1974 | Kent |
| 3,869,325 A | 3/1975 | Witzig |
| 3,874,329 A | 4/1975 | McLarty |
| 3,876,487 A | 4/1975 | Garrett et al. |
| 3,882,817 A | 5/1975 | Zink |
| 3,882,819 A | 5/1975 | Skeeters |
| 3,886,898 A | 6/1975 | Colegrove et al. |
| 3,888,713 A | 6/1975 | Alderfer |
| 3,903,233 A | 9/1975 | Dougherty |
| 3,907,536 A | 9/1975 | Achener |
| 3,918,206 A | 11/1975 | Dochnahl |
| 3,928,521 A | 12/1975 | Haren et al. |
| 3,937,644 A | 2/1976 | Bergeron et al. |
| 3,940,467 A | 2/1976 | Brachman |
| 3,941,543 A | 3/1976 | Buonanno |
| 3,944,459 A | 3/1976 | Skobel |
| 3,952,552 A | 4/1976 | Rozner |
| 3,956,438 A | 5/1976 | Schippers |
| 3,965,931 A | 6/1976 | Skobel |
| 3,981,830 A | 9/1976 | Takeuchi et al. |
| 3,999,509 A | 12/1976 | Lucas |
| 4,020,194 A | 4/1977 | McIntyre et al. |
| 4,049,760 A | 9/1977 | Lozach |
| 4,073,408 A | 2/1978 | Hartwig |
| 4,075,851 A | 2/1978 | Gardner |
| 4,077,443 A | 3/1978 | Coller et al. |
| 4,087,223 A | 5/1978 | Angioletti et al. |
| 4,096,973 A | 6/1978 | Checko |
| 4,104,207 A | 8/1978 | Pelikan et al. |
| 4,106,437 A | 8/1978 | Bartlett |
| 4,107,260 A | 8/1978 | Dougherty |
| 4,116,159 A | 9/1978 | Long |
| 4,117,196 A | 9/1978 | Mathias |
| 4,118,166 A | 10/1978 | Bartrum |
| 4,119,325 A | 10/1978 | Oakley et al. |
| 4,123,100 A | 10/1978 | Ellis |
| 4,124,336 A | 11/1978 | Johnson |
| 4,130,535 A | 12/1978 | Coran et al. |
| 4,144,838 A | 3/1979 | Ichiyanagi et al. |
| 4,156,044 A | 5/1979 | Mracek et al. |
| 4,156,533 A * | 5/1979 | Close ............... F01N 3/2857 277/652 |
| 4,157,149 A | 6/1979 | Moen |

(56) References Cited

U.S. PATENT DOCUMENTS

| | | |
|---|---|---|
| 4,181,647 A | 1/1980 | Beach |
| 4,181,780 A | 1/1980 | Brenner et al. |
| 4,185,416 A | 1/1980 | Wilmes |
| 4,187,068 A | 2/1980 | Vassar |
| 4,189,520 A | 2/1980 | Gauchel |
| 4,200,207 A | 4/1980 | Akers et al. |
| 4,204,496 A | 5/1980 | Ikegami et al. |
| 4,204,821 A | 5/1980 | Gauchel et al. |
| 4,206,011 A | 6/1980 | Kanotz et al. |
| 4,208,200 A | 6/1980 | Claypoole et al. |
| 4,212,787 A | 7/1980 | Matsuda et al. |
| 4,222,729 A | 9/1980 | Ragazzini et al. |
| 4,226,662 A | 10/1980 | McCort |
| 4,238,260 A | 12/1980 | Washkewicz |
| 4,246,299 A | 1/1981 | Ohls |
| 4,258,646 A | 3/1981 | Kloczewski et al. |
| 4,259,379 A | 3/1981 | Britton et al. |
| 4,263,348 A | 4/1981 | Renegar |
| 4,274,596 A | 6/1981 | Howes |
| 4,274,821 A | 6/1981 | Kiemer |
| 4,277,301 A | 7/1981 | McIntyre et al. |
| 4,287,684 A | 9/1981 | McKann |
| 4,288,482 A | 9/1981 | Beck |
| 4,290,249 A | 9/1981 | Mass |
| 4,296,062 A | 10/1981 | Gauchel et al. |
| 4,299,186 A | 11/1981 | Pipkin et al. |
| 4,299,187 A | 11/1981 | Renegar |
| 4,305,900 A | 12/1981 | Cavalli |
| 4,305,984 A | 12/1981 | Boyce |
| 4,308,352 A | 12/1981 | Knaus |
| 4,309,160 A | 1/1982 | Poutanen et al. |
| 4,311,628 A | 1/1982 | Abdou-Sabet et al. |
| 4,312,950 A | 1/1982 | Snyder et al. |
| 4,312,958 A | 1/1982 | DiGiulio et al. |
| 4,313,645 A | 2/1982 | Cocco |
| 4,314,834 A | 2/1982 | Feenstra et al. |
| 4,321,072 A | 3/1982 | Dubos et al. |
| 4,323,655 A | 4/1982 | DiGiulio et al. |
| 4,328,273 A * | 5/1982 | Yackiw .................. E06B 7/231 156/244.11 |
| 4,341,509 A | 7/1982 | Harlow |
| 4,343,845 A | 8/1982 | Burden et al. |
| 4,344,710 A | 8/1982 | Johnson et al. |
| 4,347,806 A | 9/1982 | Argazzi et al. |
| 4,352,892 A | 10/1982 | Lohmar |
| 4,354,989 A | 10/1982 | Beach |
| 4,356,216 A | 10/1982 | Gailey et al. |
| 4,358,497 A | 11/1982 | Miska |
| 4,360,395 A | 11/1982 | Suzuki |
| 4,368,224 A | 1/1983 | Jackson |
| 4,370,355 A | 1/1983 | Niesse |
| 4,387,123 A | 6/1983 | Wollam et al. |
| 4,401,612 A | 8/1983 | Nehmey et al. |
| 4,401,783 A | 8/1983 | Kotian |
| 4,409,165 A | 10/1983 | Kim |
| 4,409,365 A | 10/1983 | Coran et al. |
| 4,411,941 A | 10/1983 | Azzola |
| 4,419,309 A | 12/1983 | Krutchen |
| 4,419,958 A | 12/1983 | Roba |
| 4,421,867 A | 12/1983 | Nojiri et al. |
| 4,438,223 A | 3/1984 | Hunter |
| 4,442,788 A | 4/1984 | Weis |
| 4,446,179 A | 5/1984 | Waugh |
| 4,454,687 A | 6/1984 | Baker |
| 4,458,376 A | 7/1984 | Sitko |
| 4,458,450 A | 7/1984 | Young et al. |
| 4,470,941 A | 9/1984 | Kurtz |
| 4,474,830 A | 10/1984 | Taylor |
| 4,476,165 A | 10/1984 | McIntyre |
| 4,477,298 A | 10/1984 | Bohannon, Jr. et al. |
| 4,510,031 A | 4/1985 | Matsusura et al. |
| 4,510,884 A | 4/1985 | Rosebrooks |
| 4,512,945 A | 4/1985 | Vigano |
| 4,517,316 A | 5/1985 | Mason |
| 4,526,736 A | 7/1985 | Searl et al. |
| 4,527,825 A | 7/1985 | Clouse |
| 4,530,851 A | 7/1985 | Shannon et al. |
| 4,532,260 A | 7/1985 | MacKeighen et al. |
| 4,535,564 A | 8/1985 | Yackiw |
| 4,537,825 A | 8/1985 | Yardley |
| 4,538,380 A | 9/1985 | Colliander |
| 4,557,217 A | 12/1985 | Zingg |
| 4,559,095 A | 12/1985 | Babbin |
| 4,562,023 A | 12/1985 | Pabst et al. |
| 4,563,141 A | 1/1986 | Zoller |
| 4,568,507 A | 2/1986 | Baxter |
| 4,569,704 A | 2/1986 | Bohannon, Jr. et al. |
| 4,581,383 A | 4/1986 | Park |
| 4,583,485 A | 4/1986 | Smith, Jr. |
| 4,585,035 A | 4/1986 | Piccoli |
| 4,587,133 A | 5/1986 | Shannon et al. |
| 4,589,367 A | 5/1986 | Renegar et al. |
| 4,593,062 A | 6/1986 | Puydak et al. |
| 4,600,728 A | 7/1986 | MacKeighen et al. |
| 4,601,918 A | 7/1986 | Zaman et al. |
| 4,604,300 A | 8/1986 | Keys et al. |
| 4,613,521 A | 9/1986 | Smith, Jr. |
| 4,616,052 A | 10/1986 | Habibullah |
| 4,622,092 A | 11/1986 | Bohannon, Jr. et al. |
| 4,623,501 A | 11/1986 | Ishizaki |
| 4,628,639 A | 12/1986 | Lownsdale |
| 4,644,898 A | 2/1987 | Jochem et al. |
| 4,649,856 A | 3/1987 | Shannon et al. |
| 4,651,672 A | 3/1987 | Sommer |
| 4,652,475 A | 3/1987 | Haney et al. |
| 4,654,262 A | 3/1987 | Alonso |
| 4,656,785 A * | 4/1987 | Yackiw .................. E06B 7/2312 49/489.1 |
| 4,658,548 A | 4/1987 | Gerritsen |
| 4,659,746 A | 4/1987 | Topcik |
| 4,660,147 A | 4/1987 | Allen, Jr. et al. |
| 4,660,338 A * | 4/1987 | Wagner .................. E06B 5/164 49/504 |
| 4,668,319 A | 5/1987 | Piccoli |
| 4,676,025 A * | 6/1987 | Mattscheck ........... E06B 7/2314 169/48 |
| 4,680,317 A | 7/1987 | Kuhnel et al. |
| 4,683,166 A | 7/1987 | Yuto et al. |
| 4,687,137 A | 8/1987 | Boger et al. |
| 4,688,515 A | 8/1987 | Rosebrooks |
| 4,694,627 A | 9/1987 | Omholt |
| 4,695,236 A | 9/1987 | Predohl et al. |
| 4,707,172 A | 11/1987 | Sottini et al. |
| 4,708,351 A | 11/1987 | Midooka et al. |
| 4,719,039 A | 1/1988 | Leonardi |
| 4,720,936 A | 1/1988 | Ellingson |
| 4,721,591 A | 1/1988 | Cheng-Shiang |
| 4,722,818 A | 2/1988 | Zoller |
| 4,725,468 A | 2/1988 | McIntyre |
| 4,729,807 A | 3/1988 | Hede et al. |
| 4,730,416 A | 3/1988 | Eames |
| 4,735,169 A | 4/1988 | Cawston et al. |
| 4,738,810 A | 4/1988 | Cheng-Shiang |
| 4,742,646 A | 5/1988 | Kehrli |
| 4,746,477 A | 5/1988 | Wecker et al. |
| 4,746,545 A | 5/1988 | McIntyre |
| 4,756,271 A | 7/1988 | Maier |
| 4,767,183 A | 8/1988 | Martin |
| 4,774,109 A | 9/1988 | Hadzimihalis et al. |
| 4,778,367 A | 10/1988 | Hilakos |
| 4,784,902 A * | 11/1988 | Crompton ............... B32B 27/04 442/373 |
| 4,805,554 A | 2/1989 | MacIntyre |
| 4,807,397 A | 2/1989 | Doan |
| 4,844,004 A | 7/1989 | Hadzimihalis et al. |
| 4,856,975 A | 8/1989 | Gearhart |
| 4,857,668 A | 8/1989 | Buonanno |
| 4,865,676 A | 9/1989 | Kimura et al. |
| 4,880,674 A | 11/1989 | Shimizu |
| 4,883,690 A | 11/1989 | Carter |
| 4,883,691 A | 11/1989 | McIntyre |
| 4,889,669 A | 12/1989 | Suzuki |
| 4,891,249 A | 1/1990 | McIntyre |
| 4,894,105 A | 1/1990 | Dyksterhouse et al. |

(56) References Cited

U.S. PATENT DOCUMENTS

| | | |
|---|---|---|
| 4,898,760 A | 2/1990 | Halberstadt et al. |
| 4,900,490 A | 2/1990 | Kozma |
| 4,907,741 A | 3/1990 | McIntyre |
| 4,916,863 A | 4/1990 | Burrous et al. |
| 4,918,111 A | 4/1990 | Tanaka et al. |
| 4,919,739 A | 4/1990 | Dyksterhouse et al. |
| 4,930,257 A | 6/1990 | Windgassen |
| 4,940,557 A | 7/1990 | Kimura |
| 4,943,472 A | 7/1990 | Dyksterhouse et al. |
| 4,968,854 A | 11/1990 | Benn, Sr. et al. |
| 4,984,533 A | 1/1991 | Takahashi et al. |
| 5,000,988 A | 3/1991 | Inoue et al. |
| 5,001,865 A | 3/1991 | Procton |
| 5,007,203 A | 4/1991 | Katrynuik |
| 5,009,947 A | 4/1991 | McManus et al. |
| 5,070,111 A | 12/1991 | Dumbauld |
| 5,075,139 A | 12/1991 | Crumbach et al. |
| 5,087,488 A | 2/1992 | Cakmakci |
| 5,093,181 A | 3/1992 | Sanchez |
| 5,094,792 A | 3/1992 | Baran |
| 5,128,198 A | 7/1992 | Dyksterhouse et al. |
| 5,143,772 A | 9/1992 | Iwasa |
| 5,156,715 A | 10/1992 | Starnes, Jr. |
| 5,160,541 A | 11/1992 | Fickling et al. |
| 5,169,449 A | 12/1992 | Raught |
| 5,186,279 A | 2/1993 | Chasteen et al. |
| 5,192,586 A | 3/1993 | Mertinooke et al. |
| 5,205,890 A | 4/1993 | Darsey et al. |
| 5,221,346 A | 6/1993 | Anderson |
| 5,237,383 A | 8/1993 | Parisi |
| 5,237,917 A | 8/1993 | Traut et al. |
| 5,251,809 A | 10/1993 | Drummond et al. |
| 5,266,019 A | 11/1993 | Farber |
| 5,271,794 A | 12/1993 | Jarrell et al. |
| 5,279,087 A * | 1/1994 | Mann ............... E06B 5/164 49/477.1 |
| 5,326,592 A | 7/1994 | Goewey et al. |
| 5,354,378 A | 10/1994 | Hauser et al. |
| 5,368,644 A | 11/1994 | Delgado |
| 5,382,401 A | 1/1995 | Pickett et al. |
| 593,796 A | 2/1995 | Halberstadt et al. |
| 5,393,796 A | 2/1995 | Halberstadt et al. |
| 5,409,733 A | 4/1995 | Boger et al. |
| 5,411,785 A | 5/1995 | Cook |
| 5,415,822 A | 5/1995 | Cook |
| 5,418,009 A | 5/1995 | Raterman et al. |
| 5,421,921 A | 6/1995 | Gill et al. |
| 5,423,935 A | 6/1995 | Benecke et al. |
| 5,426,894 A | 6/1995 | Headrick |
| 5,429,840 A | 7/1995 | Raterman et al. |
| 5,438,802 A | 8/1995 | Johnson |
| 5,442,825 A | 8/1995 | Hahn |
| 5,449,408 A | 9/1995 | Koaizawa et al. |
| 5,451,355 A | 9/1995 | Boissonnat et al. |
| 5,458,291 A | 10/1995 | Brusko et al. |
| 5,474,841 A | 12/1995 | Matsuki et al. |
| 5,512,601 A | 4/1996 | Halberstadt et al. |
| 5,516,545 A | 5/1996 | Sandock |
| 5,524,828 A | 6/1996 | Raterman et al. |
| 5,525,668 A | 6/1996 | Olivier |
| 5,533,675 A | 7/1996 | Benecke et al. |
| 5,538,380 A | 7/1996 | Norton et al. |
| 5,538,754 A | 7/1996 | Sandock |
| 5,571,326 A | 11/1996 | Boissonnat et al. |
| 5,573,638 A | 11/1996 | Lennon et al. |
| 5,574,118 A | 11/1996 | Olivier |
| 5,586,963 A | 12/1996 | Lennon et al. |
| 5,588,997 A | 12/1996 | Lysson et al. |
| 5,601,646 A | 2/1997 | Gardner et al. |
| 5,607,629 A | 3/1997 | DeMello et al. |
| 5,636,790 A | 6/1997 | Brusko et al. |
| 5,654,346 A | 8/1997 | Halberstadt et al. |
| 5,656,086 A | 8/1997 | Hultzsch et al. |
| 5,665,164 A | 9/1997 | Milliman |
| 5,683,036 A | 11/1997 | Benecke et al. |
| 5,685,911 A | 11/1997 | Raterman et al. |
| 5,686,165 A | 11/1997 | Cook |
| 5,700,845 A | 12/1997 | Chung et al. |
| 5,728,406 A | 3/1998 | Halberstadt et al. |
| 5,728,430 A | 3/1998 | Sartor et al. |
| 5,728,911 A | 3/1998 | Hall |
| 5,733,608 A | 3/1998 | Kessel et al. |
| 5,759,659 A * | 6/1998 | Sanocki ............... F16L 59/02 244/119 |
| 5,788,889 A | 8/1998 | DeMello et al. |
| 5,795,516 A | 8/1998 | Cho et al. |
| 5,801,209 A | 9/1998 | Chung et al. |
| 5,802,948 A | 9/1998 | Andrisin, III et al. |
| 5,804,284 A | 9/1998 | Lennon et al. |
| 5,824,400 A | 10/1998 | Petrakis et al. |
| 5,843,230 A | 12/1998 | Potjer et al. |
| 5,843,231 A | 12/1998 | Spencer et al. |
| 5,851,566 A | 12/1998 | Potjer et al. |
| 5,875,555 A | 3/1999 | Andrisin, III et al. |
| 5,887,392 A | 3/1999 | Martin |
| 5,903,004 A | 5/1999 | Koshihara et al. |
| 5,907,004 A | 5/1999 | Dozeman et al. |
| 5,943,825 A * | 8/1999 | Procton ............... E06B 1/70 49/469 |
| 5,948,858 A | 9/1999 | Dorrestijn et al. |
| 5,962,075 A | 10/1999 | Sartor et al. |
| 5,968,854 A | 10/1999 | Akopian et al. |
| 5,995,693 A | 11/1999 | Yang et al. |
| 6,132,809 A | 10/2000 | Hynes et al. |
| 6,227,634 B1 | 5/2001 | Cittadini |
| 6,514,604 B2 | 2/2003 | Gopalan et al. |
| 6,623,014 B1 | 9/2003 | Martin |
| 6,677,020 B2 | 1/2004 | Dron |
| 6,776,948 B1 | 8/2004 | Arvidson et al. |
| 6,883,847 B2 | 4/2005 | Willett |
| 6,968,649 B2 | 11/2005 | Van Den Oord |
| 7,017,305 B2 | 3/2006 | Ikuta |
| 7,281,354 B2 | 10/2007 | Nishihara |
| D571,932 S | 6/2008 | Van Camp et al. |
| 7,419,555 B2 | 9/2008 | Kaplo et al. |
| 7,451,714 B1 * | 11/2008 | Redfern ............... B63B 19/26 114/117 |
| 7,718,251 B2 | 5/2010 | Huntress et al. |
| 8,225,553 B1 * | 7/2012 | Redfern ............... 49/477.1 |
| 8,225,554 B2 | 7/2012 | Nazaki |
| 8,510,996 B2 | 8/2013 | Foster |
| 8,679,384 B2 * | 3/2014 | Foster ............... E06B 5/164 156/78 |
| 9,358,716 B2 | 6/2016 | Huntress et al. |
| 10,265,900 B2 * | 4/2019 | Huntress ............... B29C 44/326 |
| 10,329,834 B2 * | 6/2019 | Mertinooke ............ E06B 7/2309 |
| 10,370,893 B2 * | 8/2019 | Hooper, Jr. ........... E06B 1/18 |
| 2002/0113377 A1* | 8/2002 | Mann ............... E06B 7/2316 277/628 |
| 2004/0074719 A1 | 4/2004 | Loughney |
| 2004/0123532 A1 | 7/2004 | Thill et al. |
| 2005/0102929 A1 | 5/2005 | Hoffmann et al. |
| 2005/0186396 A1 | 8/2005 | Okajima et al. |
| 2007/0113482 A1 | 5/2007 | Dumke |
| 2007/0218270 A1 | 9/2007 | Huntress et al. |
| 2008/0216411 A1* | 9/2008 | Okajima ............... B60J 10/24 49/475.1 |
| 2009/0313900 A1* | 12/2009 | Foster ............... E06B 7/231 49/70 |
| 2010/0136317 A1 | 6/2010 | Huntress |
| 2014/0199512 A1 | 7/2014 | Abramson |
| 2015/0240556 A1 | 8/2015 | Allingson |
| 2016/0237737 A1 | 8/2016 | Mertinooke |
| 2016/0237738 A1 | 8/2016 | Mertinooke |
| 2016/0318226 A1 | 11/2016 | Huntress |
| 2018/0154567 A1 | 6/2018 | Huntress |
| 2018/0283089 A1 | 10/2018 | Mertinooke |

FOREIGN PATENT DOCUMENTS

| | | |
|---|---|---|
| CN | 101249793 A | 8/2008 |
| CN | 201521229 U | 7/2010 |
| CN | 101952132 A | 1/2011 |

(56) References Cited

FOREIGN PATENT DOCUMENTS

| | | |
|---|---|---|
| CN | 202157669 U | 3/2012 |
| CN | 203719299 U | 7/2014 |
| DE | 3503200 | 5/1986 |
| DE | 202004007829 | 8/2004 |
| DE | 102008046753 | 3/2010 |
| EP | 260674 | 3/1988 |
| EP | 996552 | 1/1999 |
| EP | 1222085 | 4/2001 |
| EP | 1227947 | 5/2001 |
| FR | 1590375 | 5/1970 |
| FR | 2200109 | 4/1974 |
| FR | 2310207 | 12/1980 |
| FR | 2572678 | 5/1986 |
| GB | 1160043 | 7/1969 |
| GB | 1305808 | 2/1973 |
| GB | 1409441 | 10/1975 |
| GB | 1467534 | 3/1977 |
| GB | 1507071 | 4/1978 |
| GB | 1545511 | 5/1979 |
| GB | 2067104 | 7/1981 |
| GB | 1595214 | 8/1981 |
| GB | 2132509 | 7/1984 |
| GB | 2136484 | 9/1984 |
| GB | 2146940 | 5/1985 |
| GB | 2146941 | 5/1985 |
| GB | 2179270 | 3/1987 |
| GB | 2226965 | 7/1990 |
| GB | 2355480 | 4/2001 |
| JP | 55-101438 | 8/1980 |
| JP | 58-168544 | 10/1983 |
| JP | S59-54535 | 3/1984 |
| JP | 1101267 | 4/1989 |
| WO | 98/58528 | 12/1998 |
| WO | 2005028231 | 3/2005 |

OTHER PUBLICATIONS

Amesbury Sealing Products, Foam-Tite Foam Seals Part# 12083, copyright 2013, located online at: http://www_amesbury.com/divisions/sealing-products/parts/4/160 on Jul. 19, 2017, 1 page.

Schlegel, Q-LON QEBD 650 Door Seal, Jun. 2008, 2 pages.

Schlegel, Profile Selection Guide Building Products Devision, Jun. 2008, 2 pages.

PCT International Search Report and Written Opinion in International Application PCT/US2016/017843, dated May 19, 2016, 12 pgs.

Foam Extrusion Technology for TP Elastomer Plastic Technology, Feb. 1987, pp. 23 and 25.

Bridge, Ralph, "Polymer Extrusion", [online], May 5, 1997, pp. 1-8 [retrieved on Jun. 14, 2001]. Retrieved from the Internet<URL: http://www.cngr.uconn.edu/cheg/polymer/ c256hnp.htm>.

Geelan, B.J., "Foaming Agents" Chemical & Additives, Modern Plastics Mid-October Encclopedia Issue, vol. 67, No. 11, pp. 184-188 (1990).

Han, C. D. et al., "Studies on Wire Coating Extrusion. I. The Rheology of Wire Coating Extrusion", Polymer Engineering and Science, vol. 18, No. 13, pp. 1019-1029 (Oct. 1978).

Ligon Brothers Manufacturing Company, "Metal & Plastic Stampings, Plastic Extrusions, Metal & Plastic Assemblies", 6 pgs, (1993).

Levy, Sidney, Handbook of Profile Coextrusion and Covering-Tooling and Systems Design, Construction, Operation, pp. 1-64, 1987.

Levy, Sidney, PE., "Handbook of Profile Extrusion-Tooling & System Design, Construction, Operation", pp. 1-109 (1987).

Marketing information excerpt, Fenestration, p. 66 (Jan./ Feb. 2001).

Marketing information excerpt, Window & Door.TM., p. 52 (Jun./ Jul. 2000).

Michaeli, Walter, "Extrusion Dies for Plastics and Rubber, 2nd rev. ed.", pp. 2-11,157-159, 166-173, 178-181 (1992).

Monsanto Technical Correspondence, "Extrusion Foaming Technology for SANTOPRENE.RTM. Thermoplastic Rubber", SANTOPRENE.RTM. Thermoplastic Rubber, 18 pages (May 10, 1988).

Monsanto Technical Note, "SANTOPRENE.RTM. Thermoplastic Rubber: The Vulcanized Rubber that Processes as a Thermoplastic" SANTOPRENE.RTM. Thermoplastic Rubber, 12 pages (1985).

Monsanto Technical Paper, "Extrusion Foaming Technology for SANTOPRENE.RTM. Thermoplastic Rubber (Revised)", SANTOPRENE.RTM. Thermoplastic Rubber, 16 pages (May 13, 1987).

Monsanto, "Physical Properties", SANTOPRENE.RTM. Thermoplastic Rubber, 20 pages (1987).

Monsanto, "SANTOPRENE.RTM. Thermoplastic Rubber: Glazing and Sealing Applications" SANTOPRENE.RTM. Thermoplastic Rubber, 12 pages (1987).

Omega Engineering Inc., Specification for "Low Flow Air Process and Liquid Circulation Heaters", Online Catalogue: Electric Heater Products, [online], p. J-20 [retrieved on Jan. 31, 2003]. Retrieved from the Internet:<URL: http://www.omega.com/toc.sub.--asp/frameset.html?book=Heaters&file=AHPF.s- ub.--HEATER>.

Omega Engineering Inc., Specification for the "'T' Type air Process Heaters for In-Line Air and Gas Heating", Online Cataogue: Electric Heater Products, [online], pp. J-17, J-18 [retrieved on Jan. 31, 2003]. Retrieved from theInternet:<URL:http://www.omega.com/toc.sub.--asp/frameset.html?book-=Heaters&file=AHP.sub.--SERIES>.

Omega Engineering Inc., Specification for the "OMEGALUX AH-66136 Process Air Heater", Online Catalogue: Electric Heater Products, [online], pp. J-15, J-16 [retrieved on Jan. 31, 2003]. Retrieved from the Internet:<URL: http://www.omega.com/toc.sub.--asp/frameset.html?book= Heaters&file=AHCHEATER>.

Paulson Training Programs, Inc., "Extrusion Technology: Study Guide for Courses 2 & 3, Sessions 7-12", 4 pages (1988).

Rogers, Tracy, "Weatherseals . . . Keeping Your Customers Warm and Dry," Window and Door Fabricator TM, pp. 48, 50-51 (Oct./ Nov. 1997).

Ultrafab, Inc., Advertisement—The UltraCell Bulb (1 pg.), shown at WIN-DOOR 2000, Toronto Congress Center, Toronto, ON (Nov. 15-17, 2000).

Ultrafab, Inc., Advertisement—Ultra Grip, USGlass, Metal and Glazing, 1 pg. (Mar. 2001).

Partial International Search Report for PCT/US07/006056 dated Aug. 27, 2007, 5 pp.

Amesbury Sealing Products, Foam-Tite Selection Guide, Jan. 2013, 1 page.

Benning, C.J., "Plastic Foams: The Physics and Chemistry of Product Performance and Process Technology", vol. II: Structure Properties and Applications, 3 pages (1969).

Chart, "Resins and Compounds", Modem Plastics Mid-October Encyclopedia Issue, pp. 424-425 (1991).

Eaton, C.J., "Foam Extrusion" Primary Process, Modem Plastics Mid-October Encyclopedia Issue, vol. 67, No. 11, pp. 291-292 (1990).

Grelle, P.F. et al., "Ignition Resistant Polystyrene, A New Look at an Old Friend: The Cost Effective Alternative for the 90's", Proceedings from Structural Plastics '91 Conference and New Product Design Competition, pp. 145-155, (1991).

Levy, Sidney, P.E., "Plastic Extrusion Technology Handbook", pp. 178-183 (1981).

Levy, Sidney, P.E., "Plastic Extrusion Technology Handbook", pp. 189-201 (1989).

Walker, B.M. et al., Handbook of the Thermoplastic Elastomers—Second Edition, 4 pages (1988).

Schenectady International, SP-1077*, description and specifications, UM00040 Rev. 1 (Jan. 2001), 1 page.

* cited by examiner

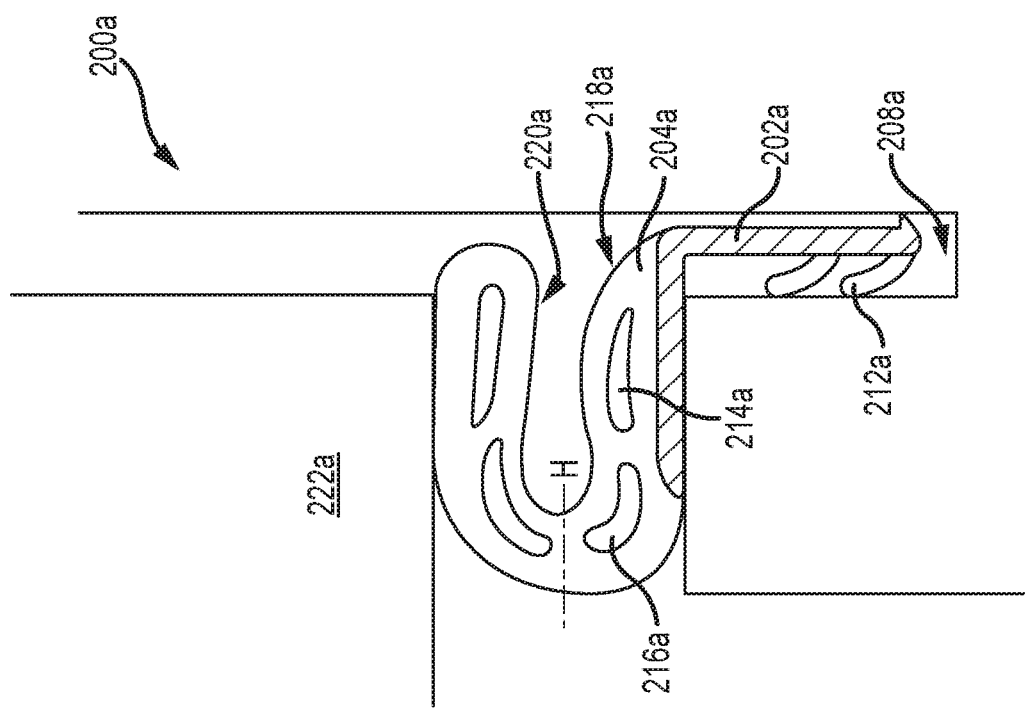
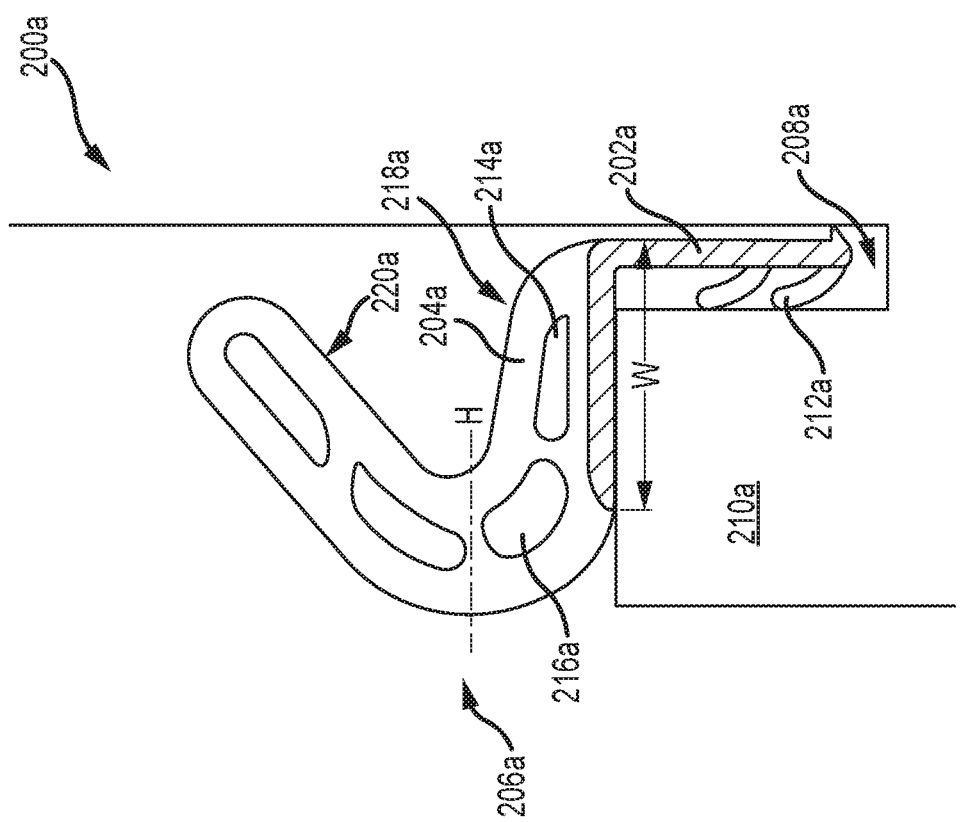

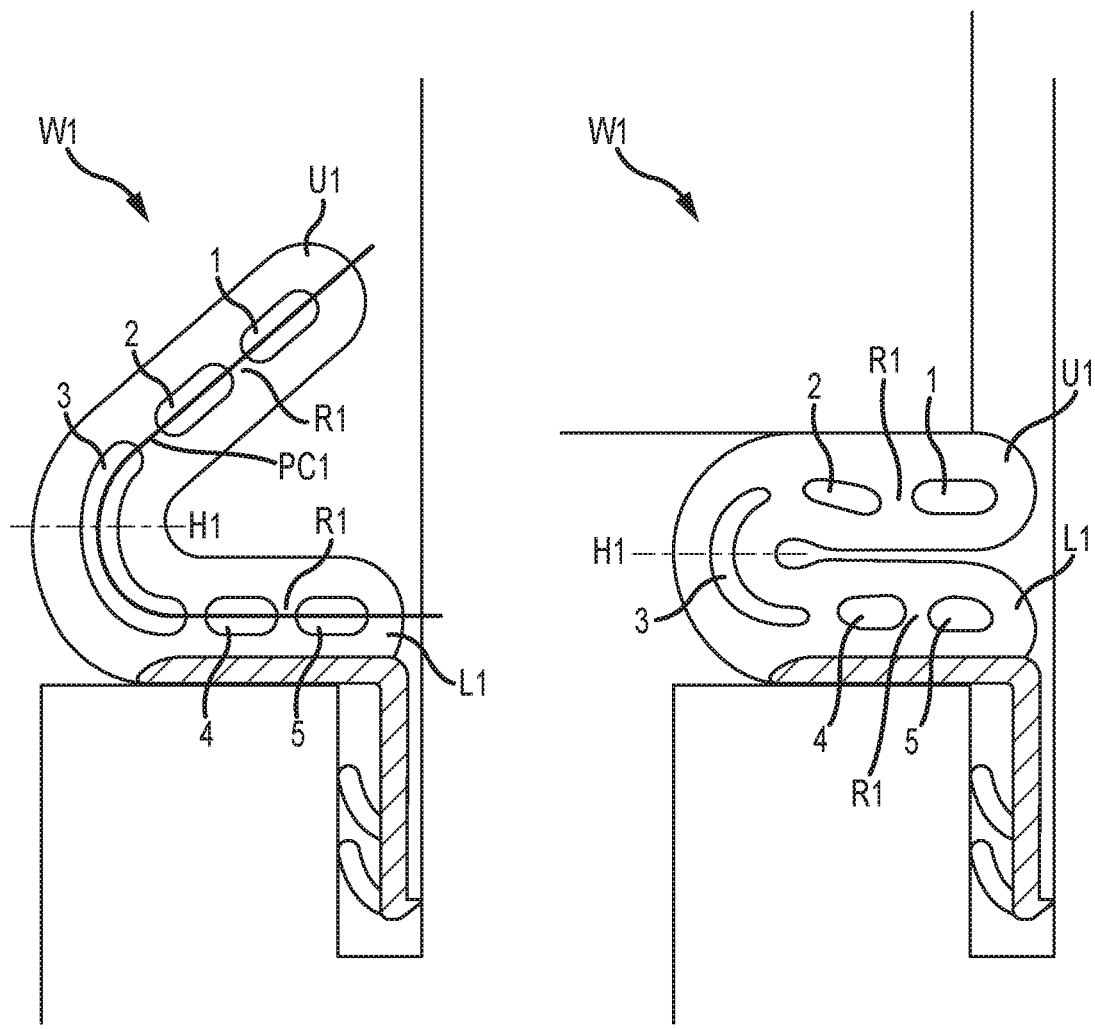

_(1)_

LOW COMPRESSION-FORCE TPE WEATHERSEALS

CROSS-REFERENCE TO RELATED APPLICATIONS

This application is a continuation of U.S. patent application Ser. No. 15/043,298, filed Feb. 12, 2016, now U.S. Pat. No. 10,329,834, which claims priority to and the benefit of U.S. Provisional Patent Application No. 62/116,105, filed, Feb. 13, 2015, the disclosures of which are hereby incorporated by reference herein in their entirety.

INTRODUCTION

Hinged swing entry doors that are designed for use in residential housing applications typically have an interface between the door and door frame that consists of a gap. The gaps are frequently filled with weatherseals (also called weatherstripping, weather strips, seals, etc.) of various designs that are often mounted to base structures that are pressed into "kerf slots" in the frame. The weatherseals are designed to maintain an effective barrier against unwanted external environmental conditions, especially the infiltration of air and water. The weatherseals helps to separate the internal and external environments by preventing the passage of noise, dust, heat, and light from one side of the door unit to the other through the gap. Certain weatherseals also have application in sliding or hinged windows and sliding doors. For clarity, however, the technologies described herein will be made in the context of hinged doors.

Most residential houses have at least one swing entry door that has a frame, hinges, and a latching mechanism that holds the door in place against a seal in order to isolate the indoor environment from the outdoor environment by reducing air and water infiltration. The hinge, latch, and head represent one general sealing challenge to weatherseals designers while the sill poses another unique challenge. Frequently, the hinge, latch, and head seals require seventeen feet of weatherseals while the sill requires three feet.

Foam weatherseals currently marketed under trade names such as Q-Lon (available from Schlegel of Rochester, N.Y.) and LoxSeal (available from Loxcreen Company of West Columbia, S.C.) are variations of open cell urethane foam molded in polyethylene film. Q-Lon in particular displays excellent recovery, low operating force, and low cost. In addition, the open cell structure allows the air to quickly evacuate from the foam when the weatherseal is compressed, reducing operating forces to minimal operating performance while maintaining adequate sealing performance. EPDM (ethylene propylene diene monomer (M-class)) rubber foam door seal profiles with a dense EPDM base mounting stem are also available, e.g., from Lauren Manufacturing Company of New Philadelphia, Ohio. Various weatherseals can include fin-shaped appendages, hollow bulb weatherseals with single or multiple openings, sponge rubber bulbs, urethane foam molded in polyethylene (PE) liner; coextruded foam bulbs, magnet/bulb seals, etc.

SUMMARY

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

In one aspect, the technology relates to a weatherseal having: a hinged foam profile having an elongate axis; a stiffener secured to the hinged foam profile; and a resin coating substantially surrounding at least a portion of the hinged foam profile, wherein the hinged foam profile defines a continuous elongate lumen extending longitudinally along the elongate axis. In an embodiment, the hinged foam profile has a first leg secured to the stiffener and a second leg integral with the first foam leg, and wherein at least one of the first leg and the second leg defines the continuous elongate lumen. In another embodiment, the stiffener includes a first stiffener leg secured to the first leg, and wherein the second leg includes a second leg axis. In yet another embodiment, the second leg axis is disposed at an acute angle to the first stiffener leg.

In another aspect, the technology relates to a weatherseal having: a stiffener; a foam profile having: a first profile portion connected to the stiffener; and a second profile portion joined to the first profile portion at a hinge, wherein each of the first profile portion and the second foam profile portion has inner surfaces facing substantially towards each other and outer surfaces facing substantially away from each other, and wherein the foam profile defines at least one continuous elongate lumen; and a resin coating at least a portion of the foam profile. In an embodiment, when a bending force is applied to the second profile portion, the inner surfaces are moved into contact with each other. In another embodiment, when a compressive force is applied to the second profile portion, the at least one continuous elongate lumen substantially collapses. In yet another embodiment, when the bending force is applied, the foam profile deforms proximate the hinge. In still another embodiment, the at least one continuous lumen is defined by the first profile portion, and wherein the first profile portion has a substantially triangular profile cross section, and wherein the at least one continuous lumen has a substantially triangular lumen cross section nested in the substantially triangular profile cross section. In another embodiment, a second continuous lumen is further defined by the second profile portion.

In another aspect, the technology relates to a method of creating a seal between a door and a frame having mounted thereon a hinged foam weatherseal defining a plurality of substantially continuous lumens, the method including: moving a first leg of the foam weatherseal from a first position to a second position; and compressing the foam weatherseal so as to reduce at least partially a cross-sectional area of at least one of the plurality of substantially continuous lumens. In an embodiment, the first leg moves to the second position upon contact with the door. In another embodiment, the moving operation and the compressing operation are performed substantially simultaneously. In yet another embodiment, the moving operation is performed prior to the compressing operation. In still another embodiment, the method includes further compressing the foam weatherseal so as to reduce completely cross-sectional areas of all of the plurality of substantially continuous lumens. In another embodiment, when in the second position, facing surfaces of the foam weatherseal are in contact.

In another aspect, the technology relates to a weatherseal having: a hinged foamed TPE profile having a nominal height of about 0.650", wherein the weatherseal includes a compression load deflection of less than about 1.25, when compressed to a thickness of about ⅜" at a rate of about 1"/minute. In an embodiment, the foamed TPE profile defines a plurality of substantially continuous elongate lumens. In another embodiment, a substantially rigid base structure is connected to a first leg of the foamed TPE profile. In yet another embodiment, a resin coating at least a portion of the foamed TPE profile.

In another aspect, the technology relates to a weatherseal having: a hinged foam profile including: a first leg; a second leg extending from the first leg at an acute angle away from the first leg; and a hinge joining the first leg and the second leg, wherein the hinge is configured to buckle when the second leg is acted upon by a force, prior to substantial compression of the hinged foam profile, and wherein at least one of the first leg, the second leg, and the hinge define a substantially continuous elongate lumen. In an embodiment, the substantially continuous elongate lumen is configured to deform during buckling of the hinge. In another embodiment, the substantially continuous elongate lumen is defined by the first leg. In yet another embodiment, the first leg has a substantially triangular cross section and wherein the substantially continuous elongate lumen has a substantially triangular cross section nested in the first leg.

In another aspect, the technology relates to a weatherseal having: a stiffener; and a hinged foam profile having an exterior surface at least partially coated with a resin, the hinged foam profile having: a first portion having a first portion cross sectional area, wherein the first portion is connected to the stiffener and defines a first lumen having a first lumen cross sectional area similar to and nested within the first portion cross sectional area; and a second portion connected to the first portion and having a second portion cross sectional area, wherein the second portion defines a second lumen having a second lumen cross sectional area similar to and nested within the second portion cross sectional area. In an embodiment, the hinged foam profile is configured to bend at a hinge location between the first portion and the second portion. In another embodiment, bending of the hinge location reduces a separation distance between a surface of the first portion and a surface of the second portion. In yet another embodiment, the first lumen is configured to collapse upon application of a force to at least one of the first portion and the second portion. In still another embodiment, the bending and the collapsing occur substantially simultaneously. In an embodiment, the first lumen is substantially triangular.

In another embodiment of the above aspect, a first portion cross section and a first lumen cross section are defined by a substantially triangular-shape. In another embodiment, a second portion cross section and a second lumen cross section are both defined by a partially oval shape. In yet another embodiment, when the second portion is acted upon by an external force, the hinged foam profile bends and the first lumen at least partially deforms. In still another embodiment, when the second portion is acted upon by the external force, a surface of the second portion contacts a surface of the first portion.

In another aspect, the technology relates to a weatherseal having: a stiffener; and a hinged profile connected to the stiffener and having a first leg and a second leg, wherein the second leg defines a substantially continuous lumen therein. In an embodiment, the hinged profile further includes a hinge connecting the first leg to the second leg, wherein when the second leg is acted upon by a compressive force, the hinged profile is configured to buckle proximate the hinge prior to deformation of the substantially continuous lumen. In another embodiment, when acted upon by the compressive force, facing surfaces of the hinged profile are configured to contact prior to deformation of the substantially continuous lumen of the second leg. In yet another embodiment, the first leg defines a substantially continuous lumen, wherein the hinged profile is configured to buckle proximate the hinge and the substantially continuous lumen of the first leg.

In another aspect, the technology relates to a weatherseal having: a hinged foam profile having: a first portion; a second portion; and a hinged portion connecting the first portion and the second portion, wherein at least one of the first portion, the second portion, and the hinged portion defines a substantially continuous lumen. In an embodiment, the hinged portion is configured to bend upon application of a force to at least one of the first portion and the second portion. In another embodiment, bending of the hinged portion reduces a separation distance between a surface of the first portion and a surface of the second portion. In yet another embodiment, the substantially continuous lumen is configured to collapse upon application of a force to at least one of the first portion and the second portion. In still another embodiment, the bending and the collapsing occur substantially simultaneously.

In another embodiment of the above aspect, the substantially continuous lumen is substantially oblong. In an embodiment, the substantially continuous lumen is substantially triangular.

BRIEF DESCRIPTION OF THE DRAWINGS

FIGS. 2A-2D depict examples of weatherseals in uncompressed and compressed states.
FIGS. 8A-20 depict examples of weatherseals incorporating one or more of the technologies described herein.

DETAILED DESCRIPTION

Door Sealing Technology, Generally

Figure 1B:
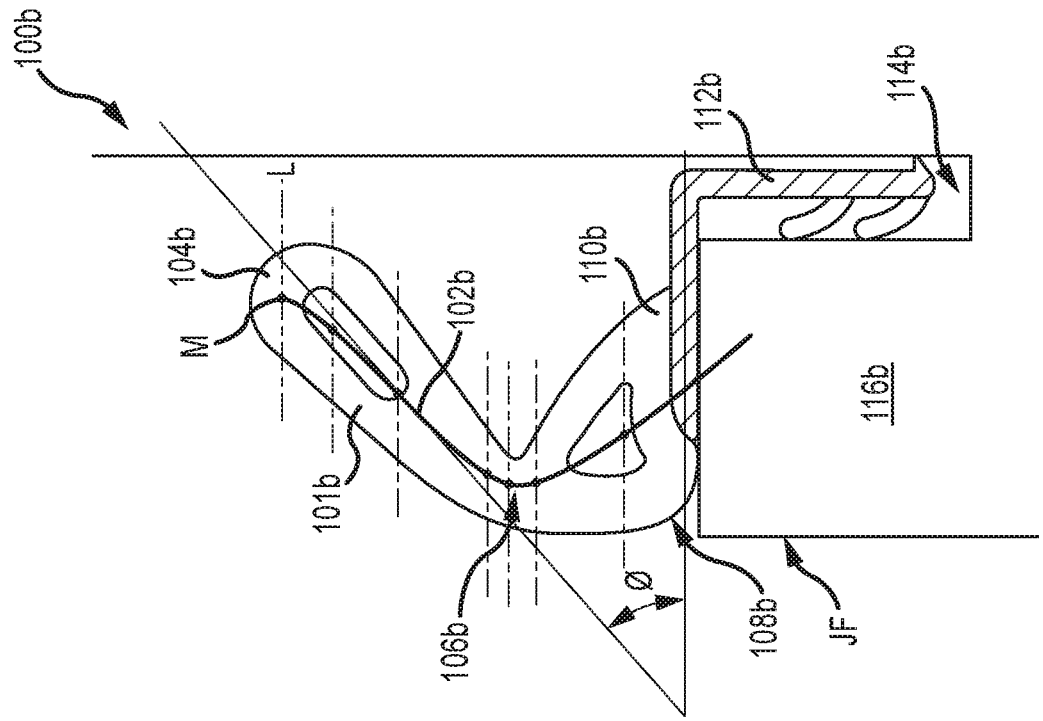
FIGS. 1A-1D depict examples of hinged profiles.

Residential door weatherseals are most often compressed to about ⅜" and are expected to seal effectively through the full compression range from the compressed thickness of about 5/16" to about ½" with the weatherseal extending to a full nominal thickness of about 0.650". Many times, a door panel or frame has uneven surfaces and requires a seal that is compliant and uniform through the compression range to ensure a proper seal and closing force under all operating conditions. A typical residential door has about 17 feet of weatherseal in the gap at the side jambs and at the head. When closed, approximately 40% of the air that resides in a typical weatherseal is evacuated through the ends of the weatherseals in the amount of time it takes to close the door the final two or three inches, which can be as little as 0.05 seconds. Some weatherseals have more open cell structures than others. Weatherseals with generally open cell structures typically allow air to evacuate freely and rapidly through the ends of the weather strip, providing little or no resistance to the door's compressive force. Weatherseals with more closed cell structures resist, restrict, or even prevent rapid air movement through the cell matrix, causing instantaneous resistance to the door's compressive force upon closing. Some closed cell structures such as those found in some EPDM foams prevent all air from exiting through the cell walls, creating a short term deformation in the weatherseals shape until the internal and external gasses have attained pressure equilibrium. This occurs in materials that are semi-permeable to atmospheric gasses such as nitrogen, oxygen, and carbon dioxide.

It is desirable that a weatherseals have good performance in the following areas and be properly certified by AAMA, NWWDA, NFRC, and other voluntary accreditation bodies:

(A) Recovery/Resistance to Compression Set: The weatherseal should recover to a condition near its original uncompressed state after being compressed for a period of time.

(B) Weatherable/UV Resistant: The weatherseal should maintain dimensional and performance attributes after exposure to weather and UV light conditions.

(C) Water Absorption/Wicking: In cold climates, water absorption into the cell structure can cause problems when the water freezes and expands. The seal should allow air to pass freely through the seal matrix (not across the sealing surface), but should not allow water to penetrate the seal matrix for the risk of freezing.

(D) Compression Force: A weatherseal should provide the proper range of operating force, or CLD (Compression Load Deflection) while tolerating a range of forces from "slamming" of a door to the low operating force of a child or elderly person (so as to meet, e.g., ADA compliance). Too low a CLD will fail to prevent air and water penetration, while too high a CLD might prevent proper closing.

Types of Existing Weatherseals

Various materials may be used to manufacture weatherseals. These include those materials described above (e.g., open cell urethane foam molded in polyethylene film, EPDM), as well as thermoplastic elastomer (TPE) and thermoplastic vulcanisate (TPV).

Existing TPE Weatherseals

TPE/TPV weatherseal designs frequently include a solid foam core of thermoplastic elastomer foam surrounded by a generally impervious outer resin coating or skin material in order to provide protection from UV degradation and from physical damage. Such weatherseals are described for example in U.S. Pat. Nos. 5,607,629; 5,393,796, and 5,192,586, the disclosures of which are hereby incorporated by reference in their entireties. Recent designs utilize a variety of surface options including covering with polyethylene film, providing bare foam areas (e.g., without a resin coating or skin material), applying low friction coatings, leaving large surface areas with no coating to reduce force and increase flexibility, and incorporating silicone and other additives to provide surface lubrication and protection. Certain of these designs are described in the patents identified above, as well as U.S. Pat. No. 7,718,251, the disclosure of which is hereby incorporated by reference in its entirety. The technology described herein can benefit from all of the aforementioned surface treatments in addition to yet-to-be developed methods and materials in order to further enhance the product's performance characteristics. Such TPE foam weatherseals are available under the brand name Foam-Tite® by Amesbury Group, Inc., of Amesbury, Mass.

Existing TPE foam is generally considered a substantially closed-cell foam cell structure due to its resistance to water penetration. Microscopic examination reveals that many of the cells actually have cell walls that opened to adjacent cells to various degrees. During cell formation, these small openings allow the blowing agent, gaseous water (steam), to escape the cell structure and upon cooling, be replaced with air until equilibrium is reached between the internal and external pressures. Due to the substantially closed-cell foam cell structure, TPE foam weatherseals provide excellent resistance to water infiltration, which makes them very desirable for use in exterior door weatherseals.

However, due to the closed-cell foam cell structure, TPE foam weatherseals offer higher than desirable CLD, which ultimately restricts their use in such applications. As solid TPE foam is compressed, air that is contained within the cells is forced through a network of microscopic interconnections between the cells in order for the foam to take on its compressed shape. These interconnections have been seen to occupy from less than about 10% to greater than about 30% of the cell wall surface, depending on such foam-forming factors as polymer melt viscosity, melt temperature, melt strength, nucleating additives, and other material and operating factors and conditions. In the case whereby the foam has been coated on the surface, the only evacuation route for the ambient air that fills the cells is via the ends of the profile. In some applications, such as windows, where operating cycles are relatively slow, the air that is internally captive within the cell structure has adequate time to evacuate the foam structure through the ends of the weatherstrip. In swing door applications, however, there is generally inadequate time to allow the air to properly evacuate the cell structure through the ends of the weatherseals as the door is closed, especially when it is "slammed" shut. This phenomenon generates a higher than acceptable operating force. In a truly closed cell structure wherein the gas that fills each cell remains completely captive, compression of the foam does not evacuate the gas and the compression rises significantly as a function of the internal gas pressure.

New TPE Weatherseals Utilizing Lumens, Generally

In order for TPE foam weatherseals to be accepted in the marketplace, they should have performance and costs similar to more common urethane seals, such as those described above. In that regard, a TPE foam weatherseal should look like a urethane weatherseal when in an uncompressed configuration. This gives the perception to consumers that the weatherseal will be able to bridge gaps between the door and the frame. Additionally, a weatherseal that returns to its original shape provides the impression of robustness that the weatherseal will not fail after repeated compressions. Similar performance is also desirable. The TPE foam weatherseal should resist abrasion, which can occur, e.g., if furniture is dragged along the weatherseal (during moving). The CLD of the weatherseal should be low enough that the door may be properly closed, without having to apply additional force thereto. If the CLD is too high, the door may not close properly, which can be particularly difficult for users with disabilities. However, the weatherseal should collapse with little applied force, since the weatherseal needs to retain sufficient resiliency across its length so as to bridge any gaps between the door and the frame. Additionally, to the extent water is drawn into the weatherstrip, either due to material used or configuration, free-flowing drainage of the water is desirable.

Recent developments in thermoplastic elastomer foaming technology have allowed the design and development of new profile shapes, configurations, and features that allow TPE foam to match or exceed the performance of urethane foam weatherseals. For example, the technologies as described herein include, e.g., weatherseals that incorporate one or more hollow channels or lumens in order to provide easier closing force. Other unique performance features and characteristics are also described herein.

In a door seal weatherseals with one or more continuous hollow tubular voids or lumens that extend the full length of the weatherstrip, the atmospheric air that is contained within the cell structure in its relaxed state can be voided from the weatherseals very rapidly upon compression, allowing the door to close with minimal force through the last inch or so of its closing distance. The cross sectional design of door weather seals is most effective when designed as a thin, angular, hinged profile, due to the requirement of compressing the seal over a broad dimensional range with little change in compression force. The lumen technologies described herein may also be utilized in round, triangular, rectangular, or square profiles. Weather seals with approximately equal thickness and width generally have a continuously increasing resistance to force when compressed while a hinged weatherseals has a more flattened resistance for force until an upper leaf of the profile makes contact with a lower leaf of the profile.

The addition of one or more of hollow channels or lumens has been incorporated into a variety of window and door seal foam profiles in order to reduce the closing force. The lumen is most commonly found in a profile both for design convenience and for the shape's universal acceptance and performance. The addition of a lumen can reduce the closing force by about 30% to about 50%, depending on the foam wall thickness and foam density. Further reductions can be achieved by shape design modifications. For example, a "loaf of bread" shape causes the foam walls to collapse inward upon compression, further reducing the force required to compress the profile.

The addition of multiple hollow channels in the foam profile provides the weatherseal designer a degree of freedom heretofore unachieved. It allows specific designs to have hinge points, secondary compression zones that compress with a second compression force after the primary compression has taken place (e.g., shock absorbers), features that enhance the compression set resistance, create product volume at a reduced cost, and features that allow the air to quickly evacuate the cell structure. The last item results from reinforcing walls that range from two to ten cells thick that are allowed to vent into multiple longitudinal chambers as the coated foam structure is compressed.

In a door seal application wherein a thin, hinged design is needed for the purpose of creating a constant closing force over a large sealing distance, one single tubular lumen at the hinge point may not be adequate to evacuate sufficient air that is captive in the cell structure to maintain a uniform compression load. In this case, multiple hollow lumens may be incorporated to evacuate more air from the cell structure. The technologies described herein utilize one to five hollow tubular lumens formed in a foam matrix in a specific shape configuration, extending the size and sealing capability without adding to the operating force. The multi-lumen configuration interacts with the hinge portion of a leaf-type door seal weatherseals to allow air to freely evacuate from the cell structure in a very rapid fashion upon rapid compression, allowing low operating force and excellent sealing performance through a range of gap sizes. This combination allows for children and individuals with disabilities to operate doors with irregularities and improper installation. It also provides adequate cushioning effect to allow the door to be slammed closed without significant structural damage.

Shapes

The weatherseals described herein may be formed in a number of general shapes, the features of which can be described, e.g., in relation to the frame of the door. FIGS. 1A-1D depict exemplary shapes of hinged profiles that can be manufactured in accordance with the teachings herein. FIG. 1A, for example, depicts a weatherseal 100a having a hinged profile 101a characterized generally by a U-shape, which is defined by a profile curve 102a. The profile curve 102a is determined by drawing a plurality of lines L substantially orthogonal to the jamb face JF. The profile curve 102a connects the midpoint M of each line L. Therefore, as depicted in FIG. 1A, this profile 101a is substantially U-shaped. The U-shaped hinged profile 101a has an upper leaf 104a, a hinge 106a, and a continuous outer surface 108a. The operation and location of these elements are described more specifically below. The lower leaf 110a is the portion of the profile 101a connected to a first arm 112a' of a stiffener 112a. The stiffener 112a is the portion of the weatherseal 100a inserted into the kerf 114 of the doorframe 116a. In the uncompressed position, the upper leaf 104a is disposed at an acute angle $\phi$ to both the lower leaf 110a and the first arm 112a' of the stiffener 112a.

Figure 1A:
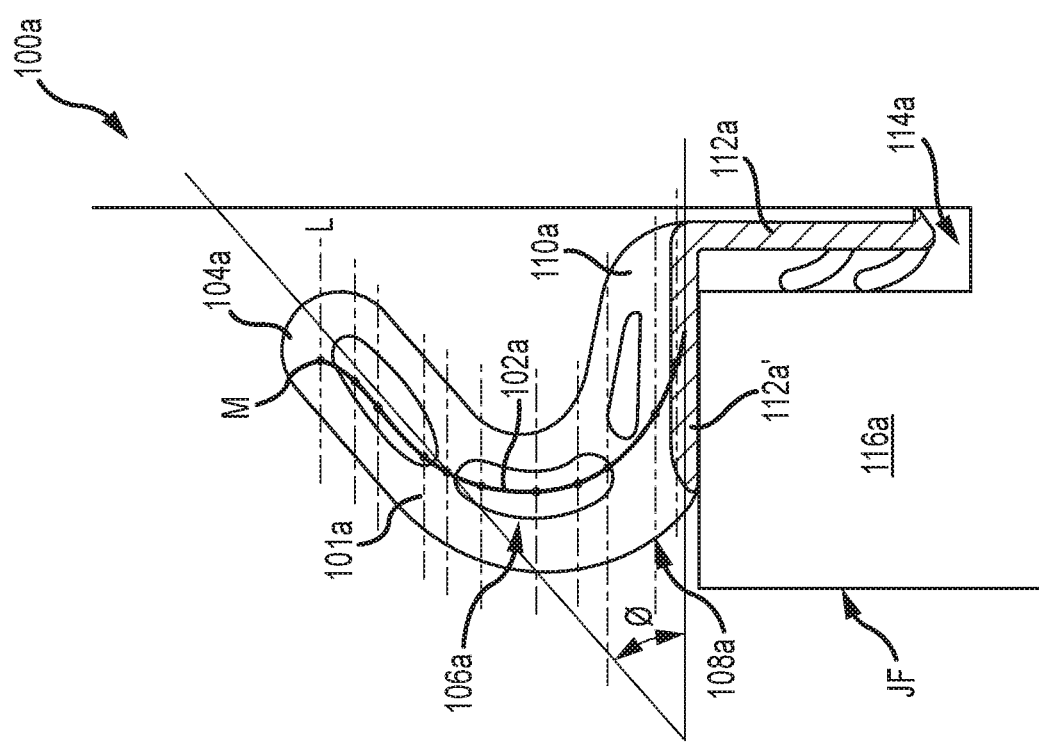

FIG. 1B depicts a weatherseal 100b having a hinged profile 101b characterized generally by a V-shape, which is substantially defined by a sharp profile curve 102b, which is again determined as described above. The V-shaped hinged profile 100b has an upper leaf 104b, a hinge 106b, a continuous outer surface 108b. A lower leaf 110b tends to have a significantly different shape than the upper leaf 104b. Regardless, the lower leaf 110b is connected to a base structure or stiffener 112b, which is inserted into the kerf 114b of the doorframe 116b. In the uncompressed position, the upper leaf 104b is disposed at an acute angle $\phi$ to both the lower leaf 110b and the first arm 112b' of the stiffener 112b.

Figure 1D:
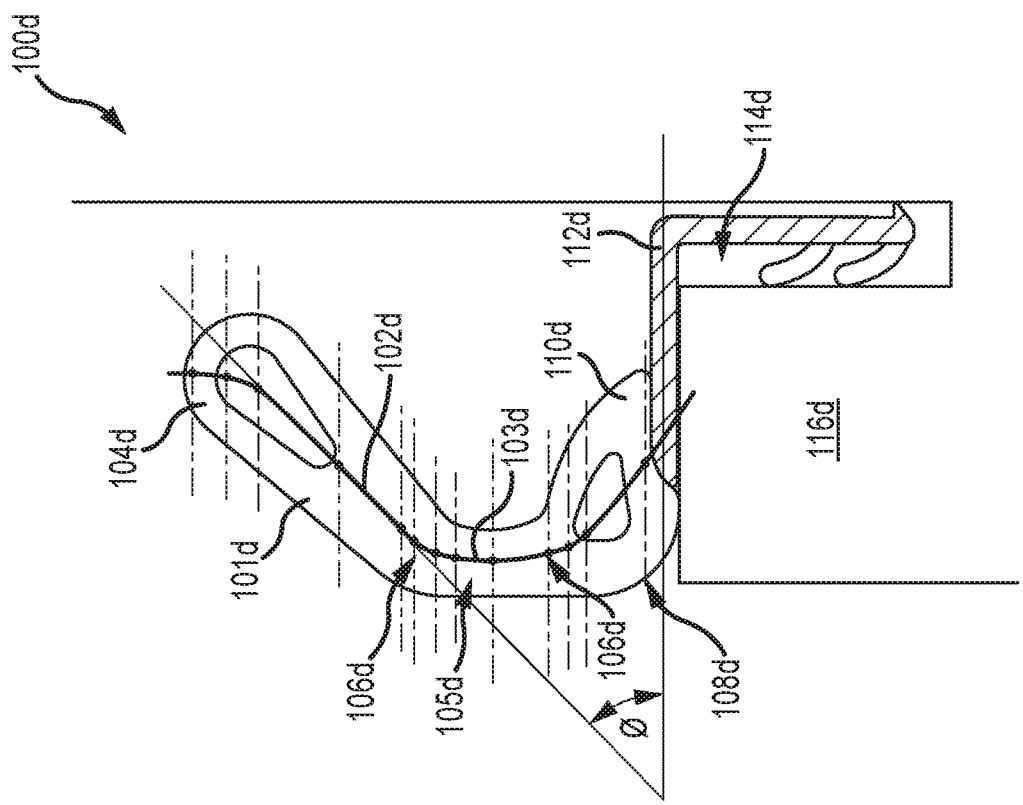
Figure 1C:
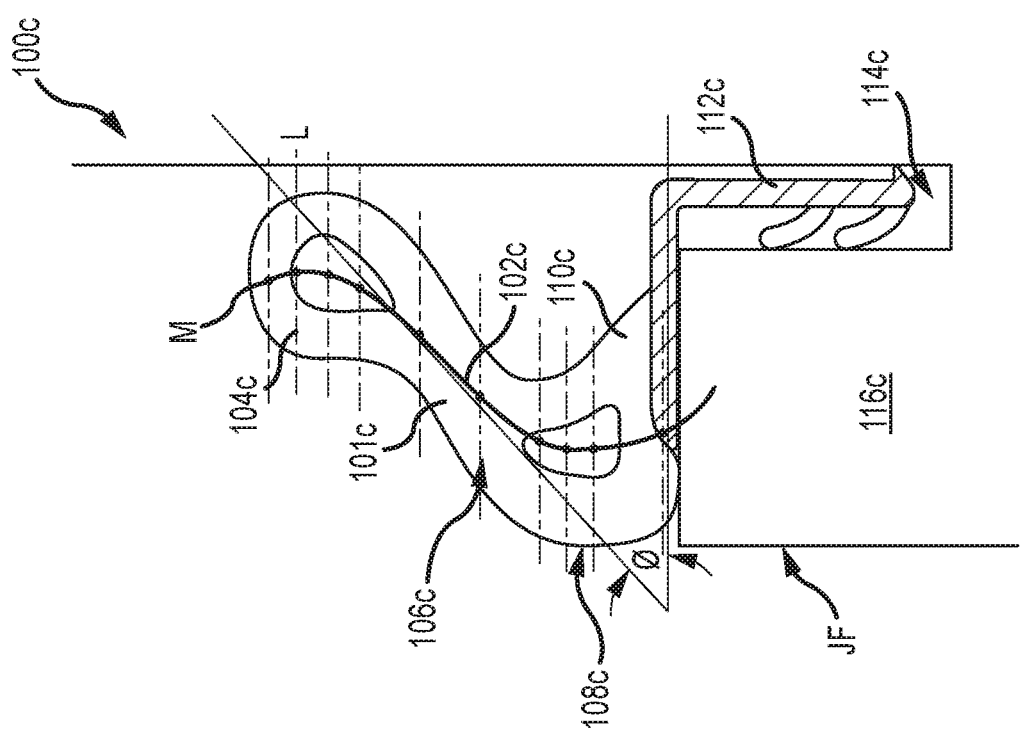

FIG. 1C depicts a weatherseal 100c having a hinged profile 101c characterized generally by an S-shaped profile curve 102c, which is again determined as described above. The S-shaped hinged profile 100c has an upper leaf 104c, a hinge 106c, a continuous outer surface 108c. A lower leaf 110c is connected to a base structure or stiffener 112c, which is inserted into the kerf 114c of the doorframe 116c. In the uncompressed position, the upper leaf 104c is disposed at an acute angle $\phi$ to both the lower leaf 110c and the first arm 112c' of the stiffener 112c.

FIG. 1D depicts a weatherseal 100d having a hinged profile 101d characterized generally by a profile curve 102d, which is again determined as described above. The profile curve 102d, in this case, includes a central linear section 103d due to the elongate neck 105d that is bounded by two hinges 106d. The hinged profile 100d includes an upper leaf 104d and a continuous outer surface 108d. A lower leaf 110d is connected to a base structure or stiffener 112d, which is inserted into the kerf 114d of the doorframe 116d. In the uncompressed position, the upper leaf 104d is disposed at an acute angle $\phi$ to both the lower leaf 110d and the first arm 112d' of the stiffener 112d.

Figure 2D:
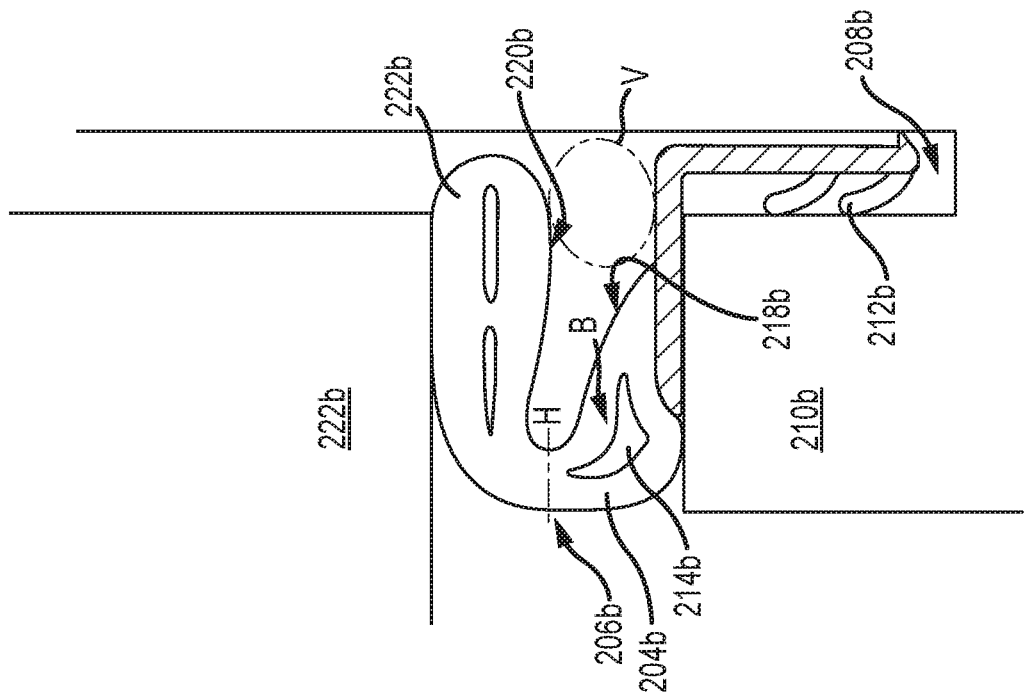

FIGS. 2A-2D depicts two examples of weatherseals 200a, 200b in uncompressed and compressed states and are used to describe, generally, stiffeners 202a, 202b, and lower leaves 204a, 204b of the profiles 206a, 206b. In FIGS. 2A-2B, the lower leaf 204a is connected to the stiffener 202a, which is inserted into the kerf 208a of the jamb 210a. The stiffener 204a may include one or more teeth 212a projecting therefrom that engage with an inner surface of the kerf 208a. The lower leaf 204a is connected to the stiffener 202a along substantially all of the width W thereof (as well as along a length thereof, extending transverse to the width W). The lower leaf 204a may be joined to the stiffener 202a with an adhesive or other connection element, or may be co-extruded therewith by joining the lower leaf 204a and the stiffener 202a along substantially the entire width W, a robust connection is formed. The lower leaf 204a terminates at the hinge H and, as such, defines two lumens 214a, 216a therein. The hinge H is the location of the profile 206a along which bending or folding takes place when the profile 206a is acted upon by an external force. As can be seen, lumen 214a, which is located distal from the hinge H maintains a substantially consistent outer profile as the profile 206a compresses to the condition depicted in FIG. 2B. This is because less deformation occurs to the portions of the lower leaf 204a distal from the hinge H. FIG. 2B corresponds to the door 222a being in a closed position and, in certain examples, inner surfaces 218a, 220a are not in contact in this position. Should inner surfaces 218a, 220a contact, however (e.g., if the door is out of plumb or the seal 200a is otherwise overcompressed), lumen 214a may collapse. Lumen 216a deforms significantly between the positions depicted in FIGS. 2A and 2B due to the proximity thereof to hinge H. As such, air is evacuated from the lumen 216a during the door closing operation, resulting in a reduced CLD of the weatherseal 200a. As described above, if the inner surfaces 218a, 220a contact, lumen 216a may completely collapse, depending on the degree of compression of the profile 206a.

Figure 2C:
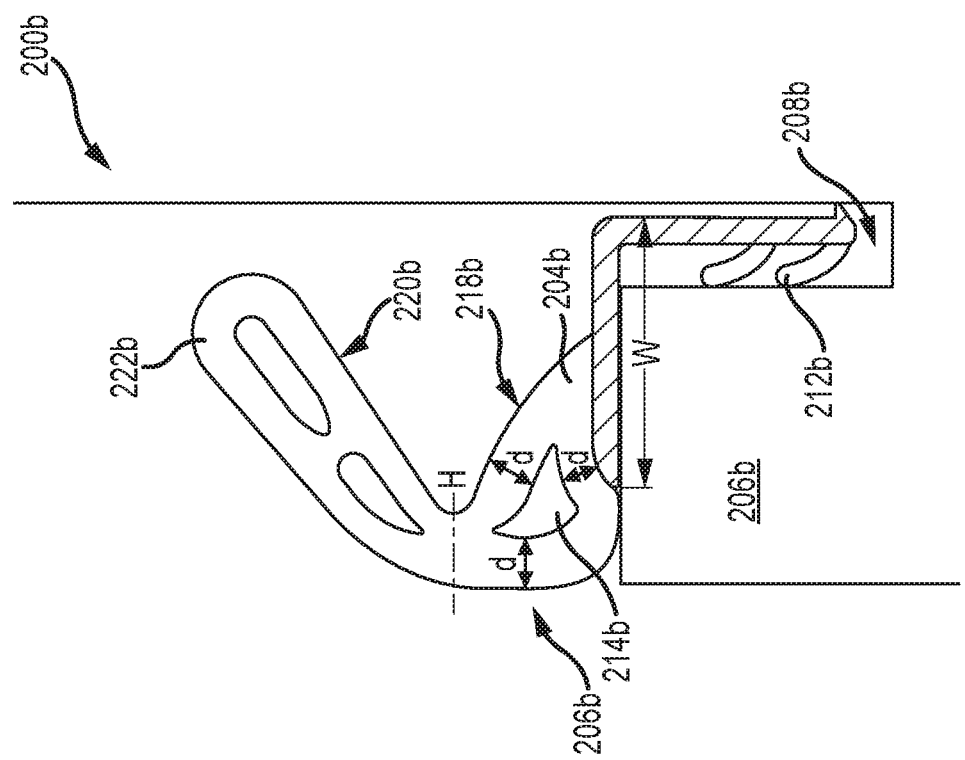

In FIGS. 2C-2D, the lower leaf 204b is connected to the stiffener 202b, which is inserted into the kerf 208b of the jamb 210b. Certain elements depicted in FIGS. 2C-2D are described above with regard to FIGS. 2A-2B and are therefore not necessarily described further. The lower leaf 204b is connected to the stiffener 202b along only a portion of the width W thereof. In examples, the length of connection may be about two-thirds or one-half of the total width W. Other lengths of connection are contemplated. By joining the lower leaf 204b to only a portion of the width W, an overcompression volume V is formed (and is depicted generally as a dashed circle in FIG. 2D). The overcompression volume V provides a volume into which an upper leaf 222b of the profile 206b may be pushed if the door 222b is overcompressed. Since the upper leaf 222b may be moved into this overcompression volume V without significant contact with the lower leaf 204b, the CLD of the profile 206b remains low. The lower leaf 204b terminates at the hinge H and defines a single lumen 214b. The lumen 214b is nested within the lower leaf 204b, in that the lumen 214b is defined by walls that are disposed substantially equal distances d from the outer bounds of the lower leaf 204b. This can provide for predictable collapsing of the lumen 214b as the profile 206b is compressed. In contrast, a lumen that is substantially round, for example, would have walls that are not necessarily disposed substantially equal distances from the outer bounds of the lower leaf. As such, collapsing of such a lumen would be less predictable. The lumen 214b folds predictably inwards (at a bulge B) as the profile 206b folds at the hinge H. FIG. 2D corresponds to the door 222b being in a closed position and, in certain examples, inner surfaces 218b, 220b are not in contact in this position. Should the seal 200b be overcompressed, the upper leaf 222b will enter overcompression volume V. Even further overcompression would cause lumen 214b to collapse further, especially if the inner surfaces 218b, 220b come into contact.

Figure 3A:
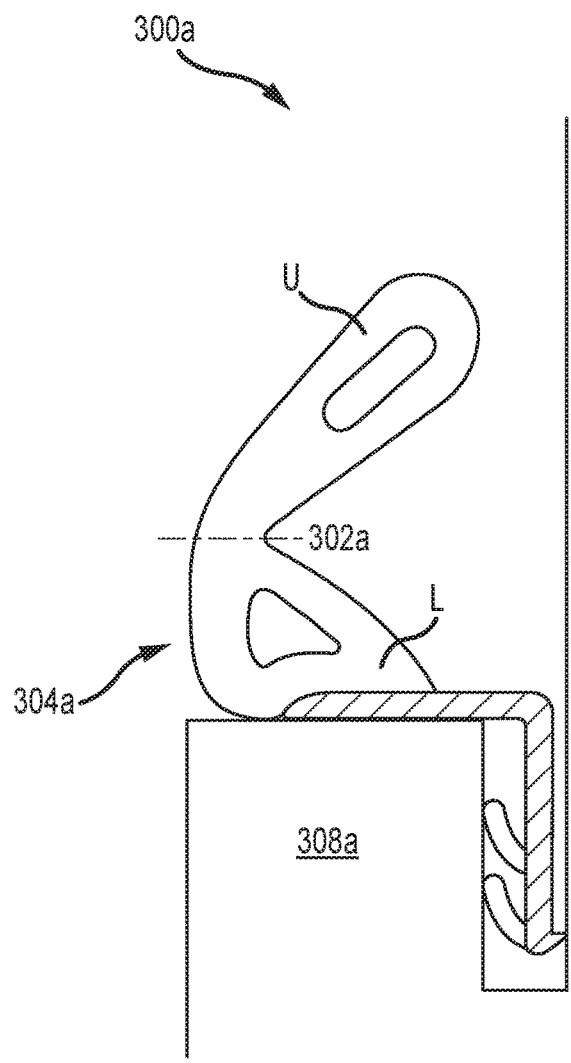
FIGS. 3A-3F depict examples of weatherseals in uncompressed and compressed states.
Figure 3B:
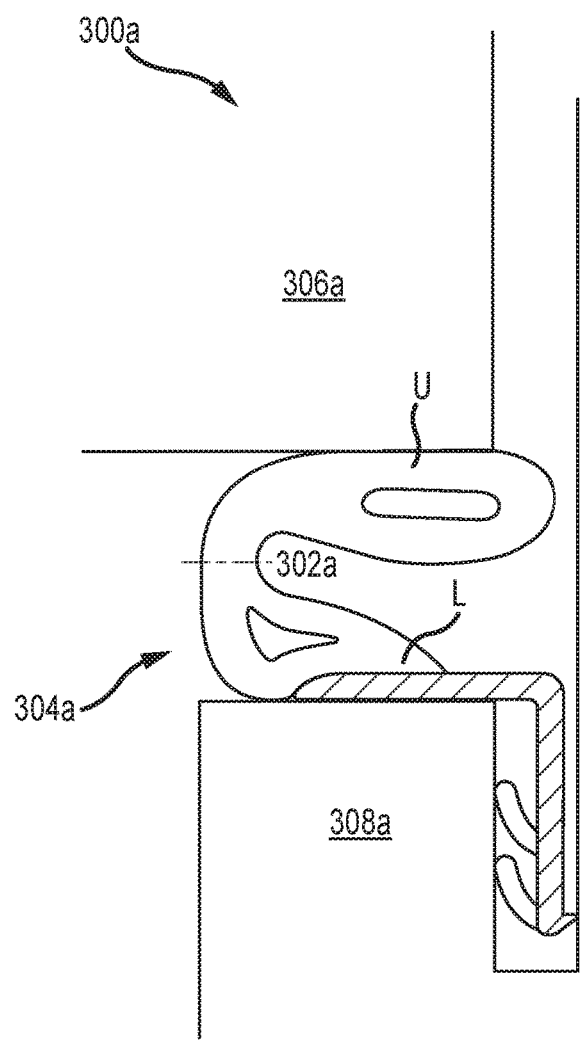

FIGS. 3A-3F depicts three examples of weatherseals 300a, 300b, 300c in uncompressed and compressed states and are used to describe, generally, function of hinges 302a, 302b, 302c. In FIGS. 3A-3B, the hinge 302a separates an upper leaf U and a lower leaf L. The hinge 302a may be defined as a line separating the upper leaf U and the lower leaf L, along which the profile 304a folds or bends when acted upon by an external force (e.g., when compressed between a door 306a and a frame 308a. In the case of the weatherseal 300a of FIGS. 3A and 3B, the hinge 302a is solid, in that it is not crossed by a lumen, as that element is defined elsewhere herein. Solid hinges 302a generally display higher CLDs than hollow hinges (described below), but also display greater recovery than hollow hinges, since more material is present to force the profile 304a to return to the uncompressed position. Additionally, solid hinges 302a appear to allow for more uniform deformation of the profile 304a above and below the hinge 302a.

Figure 3C:
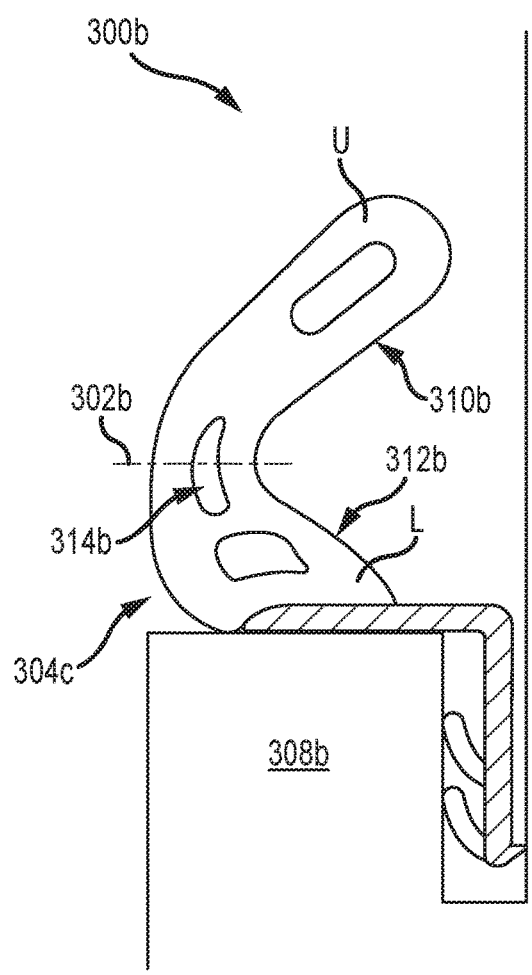
Figure 3D:
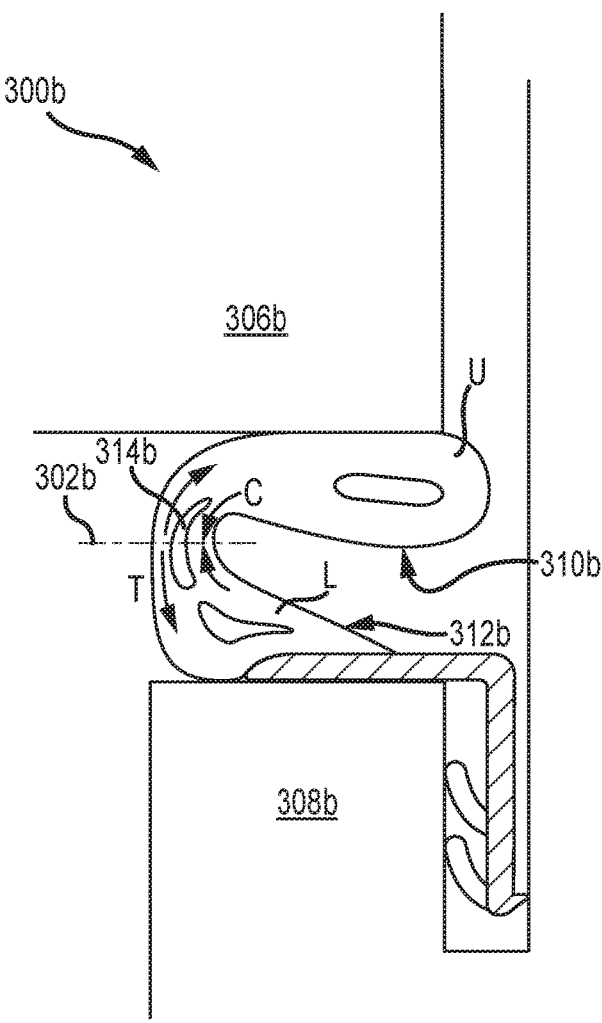

In FIGS. 3C-3D, the hinge 302b separates an upper leaf U and a lower leaf L. The hinge 302b may be a line separating the upper leaf U and the lower leaf L, along which the profile 304b folds or bends when acted upon by an external force (e.g., when compressed between a door 306b and a frame 308b). In the case of the weatherseal of FIGS. 3C and 3D, the hinge 302b is hollow, in that it is crossed by a lumen 314b, as that element is defined elsewhere herein. Hollow hinges 302b reduce the CLD, since there is less material to be folded at the hinge 302b. When acted upon by an external force, the inner portion of profile material at the hinge 302b (that is, the portion proximate the inner surfaces 310b, 312b) is under compression C. The outer portion (disposed on the opposite side of the lumen 314b from the inner portion) is under tension T. As such, forces generated by the material opposite these compression C and tension T forces bias the profile 304b towards the uncompressed position of FIG. 3C.

Figure 3E:
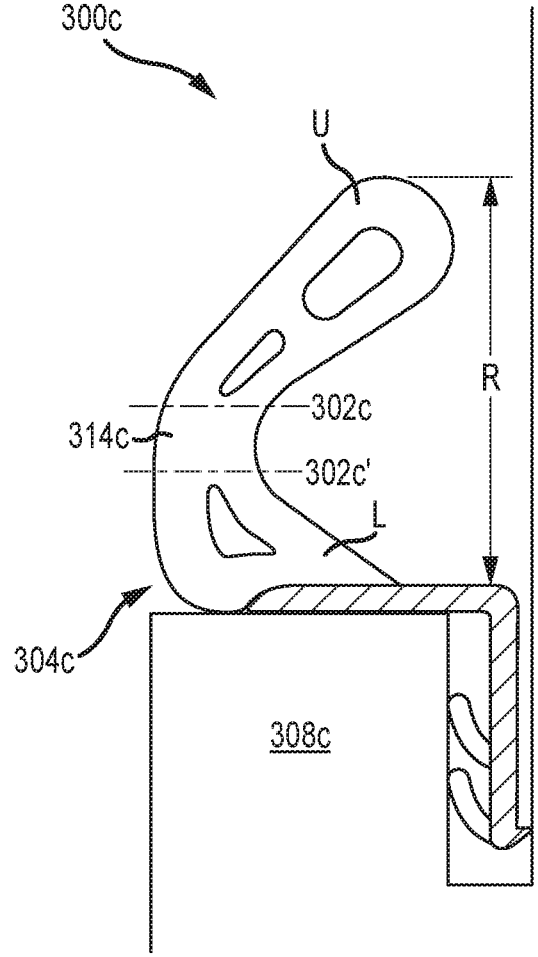
Figure 3F:
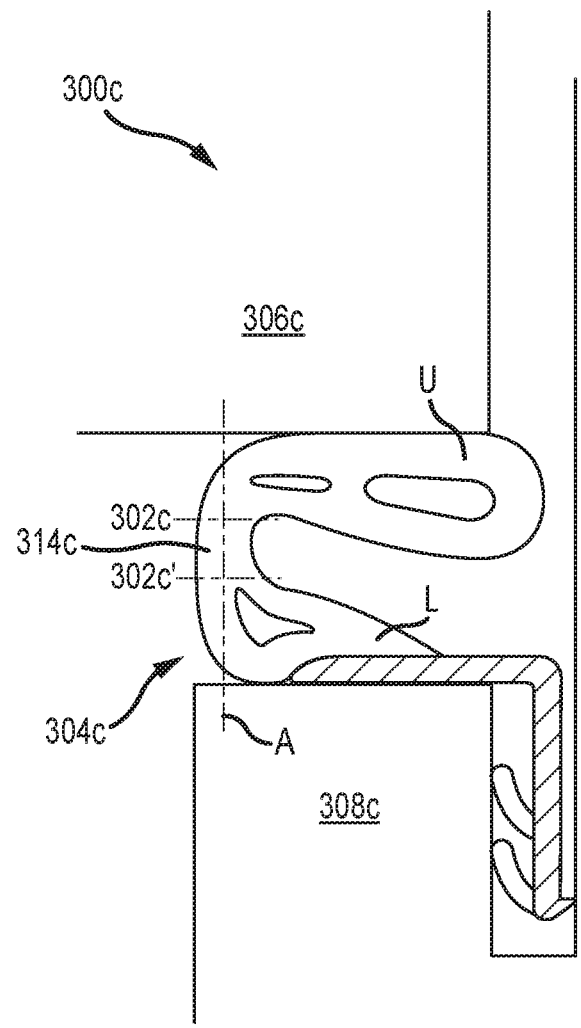

In FIGS. 3E-3F, two hinges 302c, 302c' separates an upper leaf U and a lower leaf L. These hinges 302c, 302c' are separated by a neck 314c that may allow the profile to obtain a longer reach R from the door frame 308c. More specifically, the upper hinge 302c separates the upper leaf U from the neck 314c, while the lower hinge 302c' separates from neck 314c from the lower leaf L. Each leaf 302c, 302c' folds or bends when acted upon by an external force (e.g., when compressed between a door 306c and a frame 308c). Typically, the upper hinge 302c folds first, although complete folding of the upper hinge 302c does not necessarily precede entirely folding of the lower hinge 302c'. Otherwise, folding of the two hinges 302c, 302c' is substantially similar to the folding of a single solid hinge, such as depicted previously. Additionally, since the neck 314c has an axis A disposed substantially orthogonal to the frame 308c, the neck 314c helps increase the CLD as the profile 304c is forced into the compressed position of FIG. 3F (as well as an overcompressed position, if the door 306c is moved closer to the jamb 308c for any number of reasons).

Figure 4A:
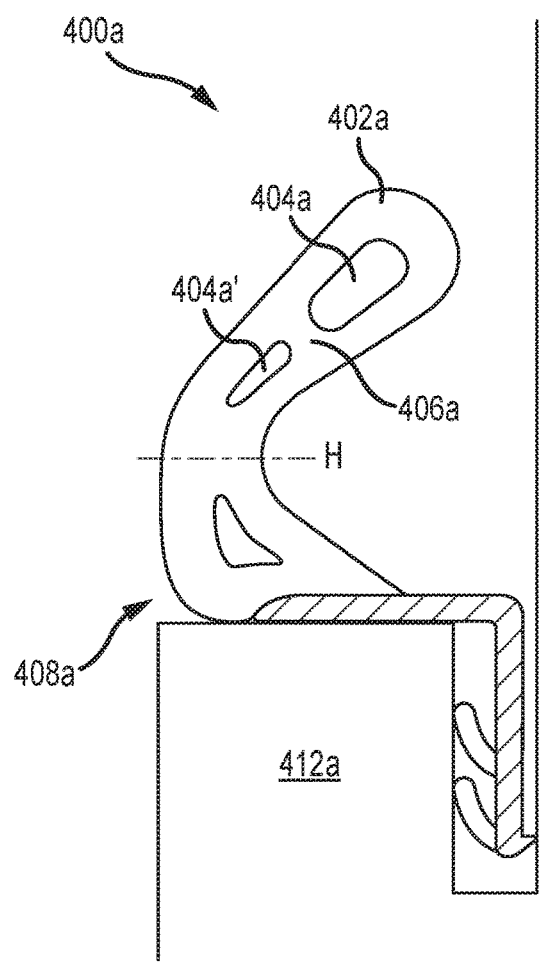
FIGS. 4A-4E depict examples of weatherseals.
Figure 4B:
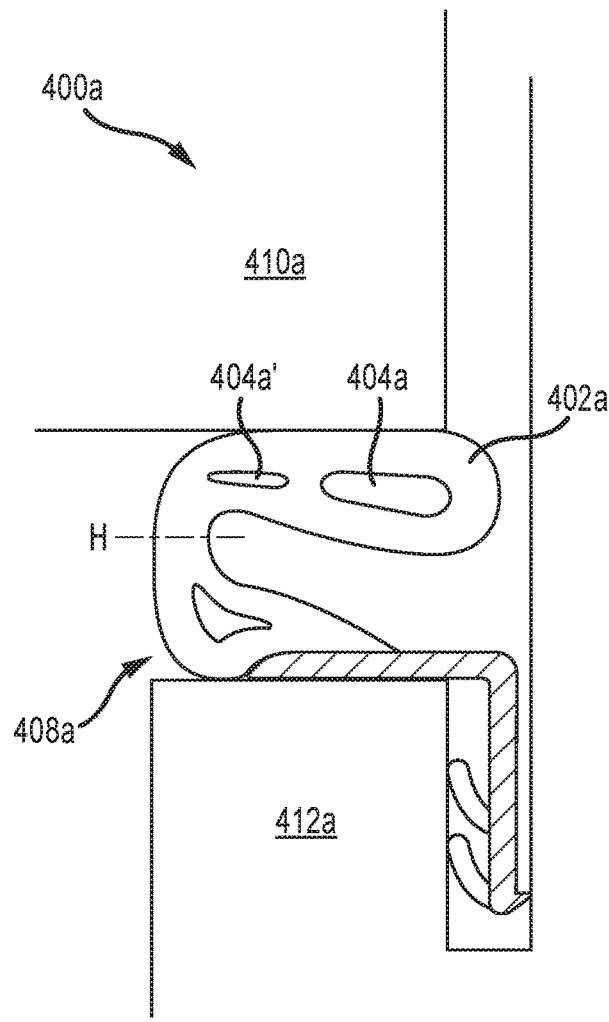

FIGS. 4A-4E depict three examples of weatherseals 400a, 400b, 400c and are used to describe, generally, function of upper leaves 402a, 402b, 402c. In FIGS. 4A and 4B, the upper leaf 402a includes two lumens 404a, 404a' separated by a rib 406a, which is manufactured from the profile 408a material. The upper leaf 402a is the first portion of the profile 408a that contacts the door 410a during closing operations. It is this contact that folds or bend the profile 408a proximate the hinge H. Use of two lumens 404a, 404a' results in a higher CLD when compressed, due to the presence of the rib 406a therebetween. This rib 406a is disposed substantially orthogonal to the jamb 412a as the profile 408a is compressed, as in FIG. 4B. If the profile 408a is overcompressed, this orthogonal orientation of the rib 406a resists further compression and deformation, thus resulting in a higher CLD.

Figures 4C, 4D:
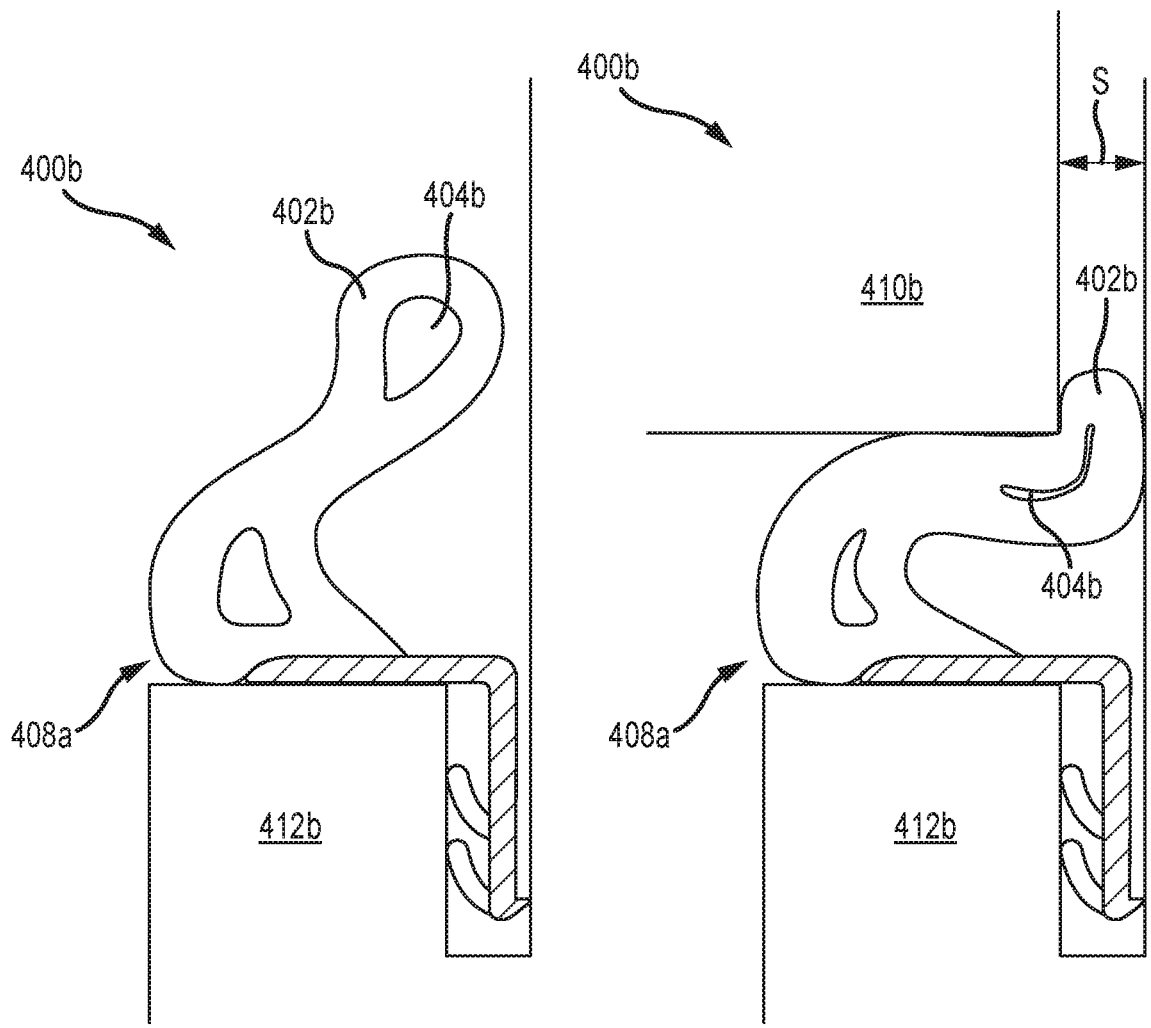

In FIGS. 4C and 4D, the weatherseal 400b has an upper leaf 402b that includes a lumen 404b. The upper leaf 402b is in the form of an outward-facing lobe (in that is faces away from the jamb 412b, towards the door 410b). This allows the upper leaf 402b to fold so as to fill the space S between the door 410b and the frame 412b. Additionally, the presence of the lumen 404b allows the upper leaf 402b to further conform to this space S. Should the upper leaf 402b not be pinched in the space S, however, the single lumen 404b otherwise reduces the CLD of the profile 408b.

Figure 4E:
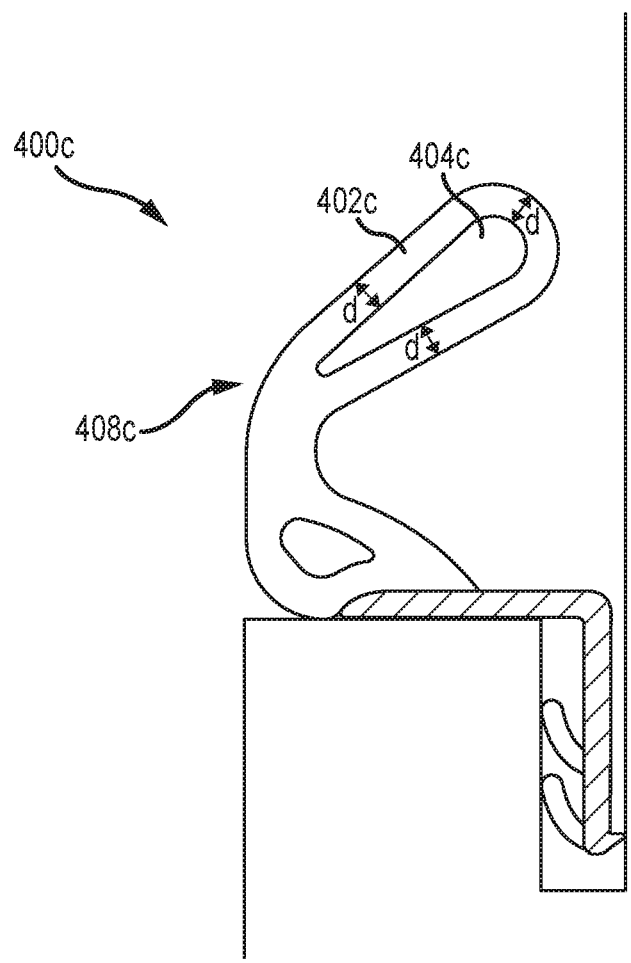

Larger lumens can even further reduce the CLD. Such a lumen 404c is depicted in FIG. 4E. In this example, the upper leaf 402c includes a large lumen 404c that is substantially nested in the upper leaf 402c. A lumen nested within a leaf may, in one example, be defined as a lumen that is disposed within the leaf, so as to be spaced on all sides by a substantially equal distance d from the outer surface of the leaf. Upper leaves having enlarged nested lumens may more easily conform to irregular surfaces between a door and a door frame. Additionally, due to the large lumen, the CLD of the profile may be significantly reduced.

Figure 5A:
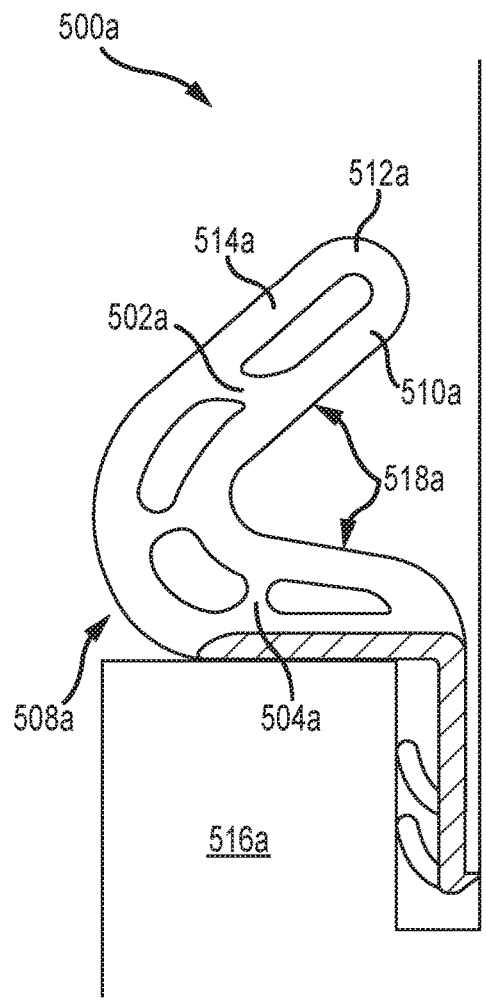
FIGS. 5A-5D depict examples of weatherseals in uncompressed and compressed states.
Figure 5B:
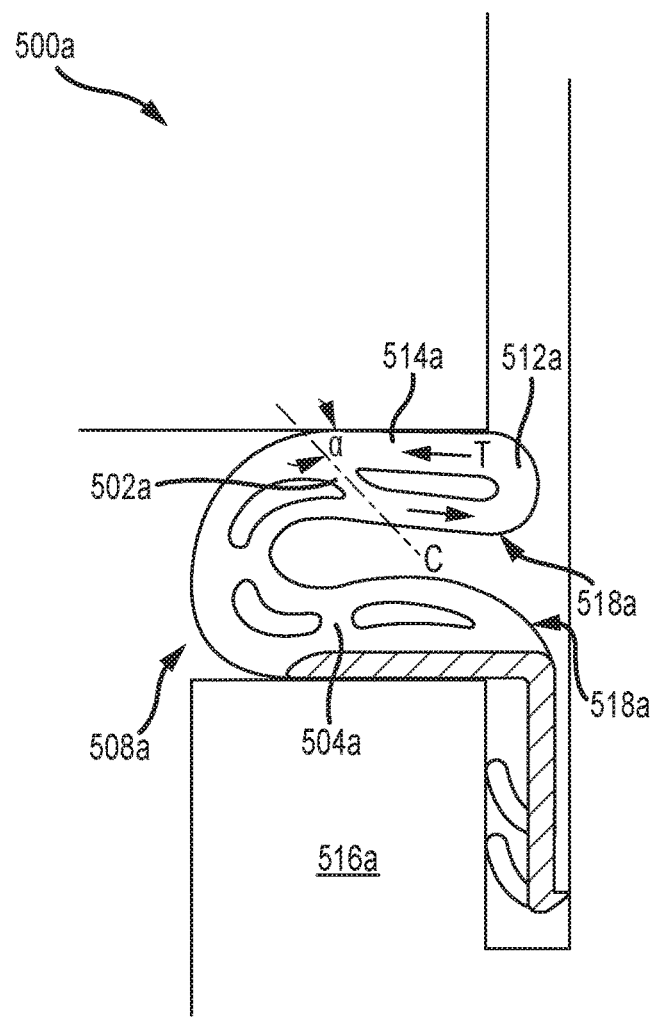
Figure 5C:
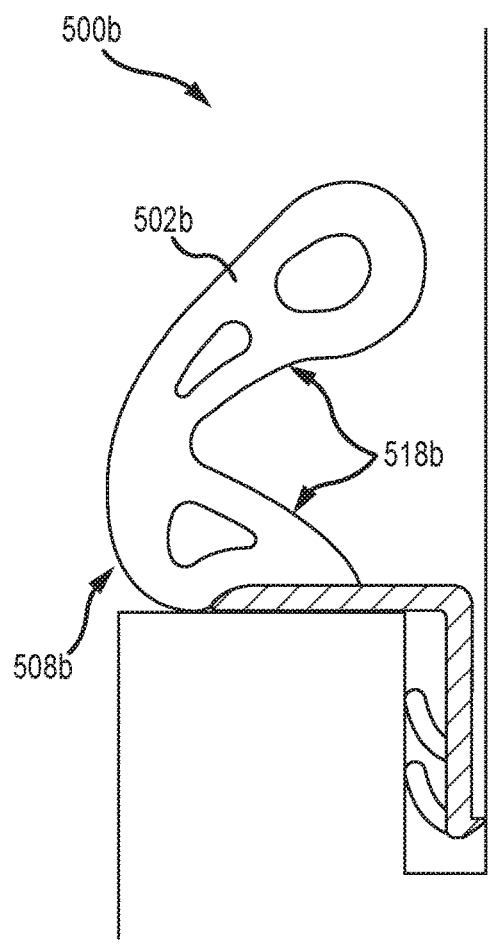
Figure 5D:
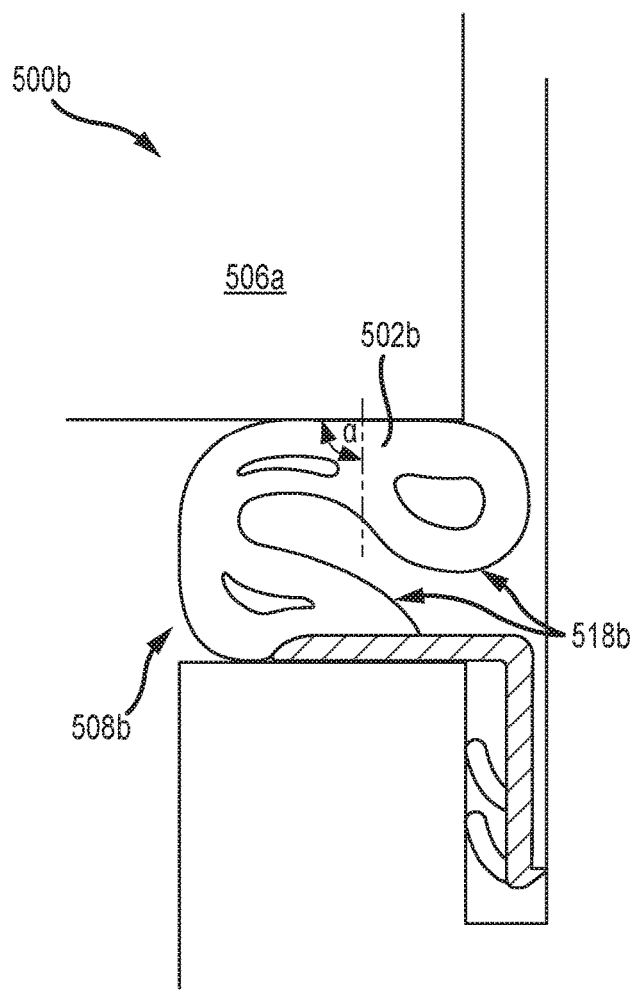

FIGS. 5A-5D depict two examples of weatherseals 500a, 500b and are used to describe, generally, function of ribs 502a, 504a, and 502b. In FIGS. 5A and 5B, upper rib 502a is disposed at an angle α to the face of the door 506a when the door 506a is in the closed position of FIG. 5B. A rib 502a having a smaller angle α to the door 506a provides less cushion to absorb impact, while a rib 502a having a larger angle α to the door 506a provides more cushion. Ribs 502a disposed generally orthogonal to the door 506a provide the greatest compression resistance and higher CLD. The rib 502a deforms as the profile 508a compresses. This places an inner portion 510a of an upper leaf 512a in compression C, while an upper portion 514a of the inner leaf 512a is in tension T. The lower rib 504a is disposed generally orthogonal to the jamb 516a and acts as a reinforcing structure to resist deformation. In FIGS. 5C and 5D, upper rib 502b is disposed at an angle α that is substantially orthogonal to the face of the door 506b when the door 506b is in the closed position of FIG. 5B. Such a rib 502b disposed generally orthogonal to the door 506b provides the greatest compression resistance and higher CLD. In general, the ribs 502a, 502b, 504a such as those depicted herein help maintain the shape of the profiles 508a, 508b. The further cushioning and impact absorption function of the ribs 502a, 502b, 504a occur when the profiles 508a, 508b are overcompressed (e.g., compressed past the closed positions of FIGS. 5B and 5D). As the inner facing surfaces 518a, 518b contact, the ribs 502a, 502b, 504a provide resistance to deformation.

Figures 6A, 6B:
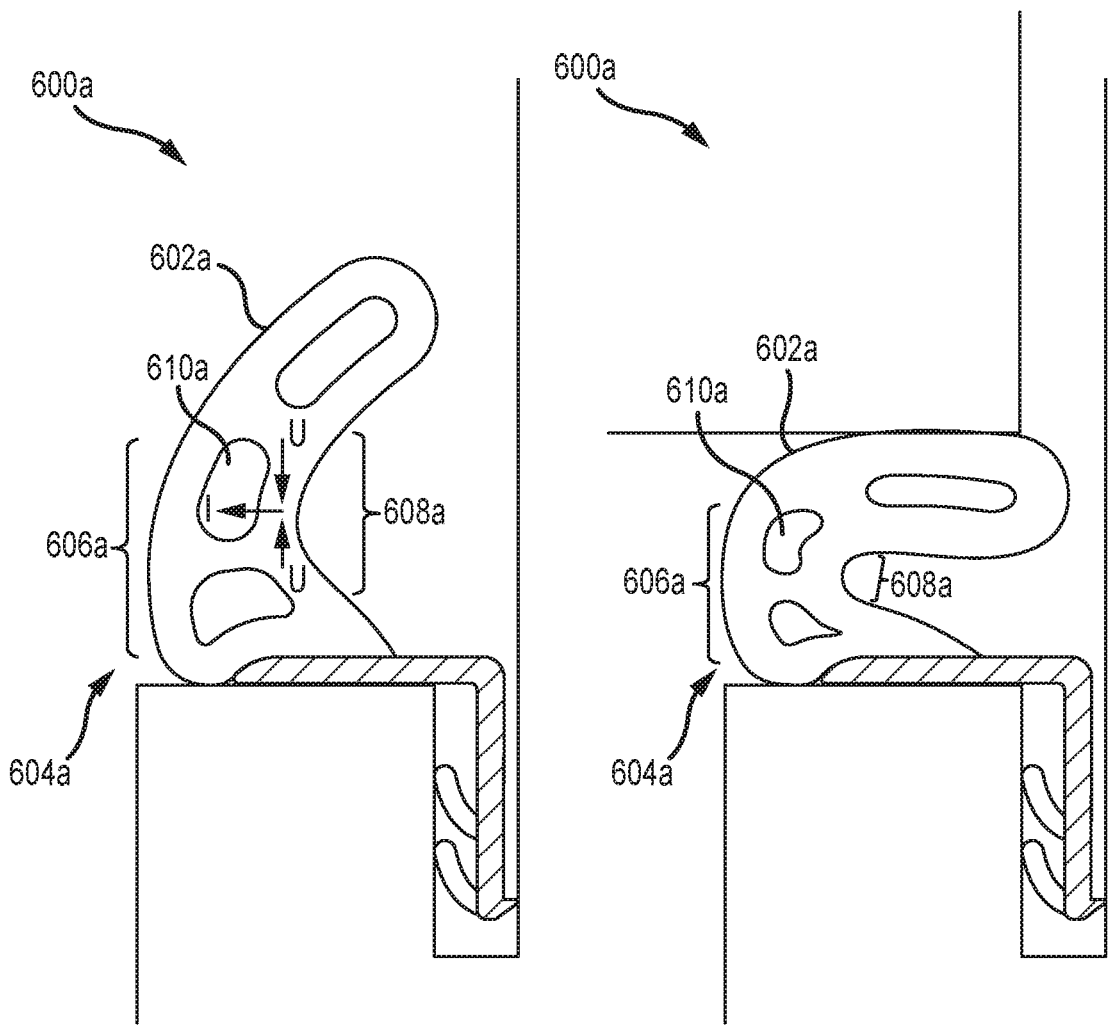
FIGS. 6A-6D depict examples of weatherseals in uncompressed and compressed states.
Figures 6C, 6D:
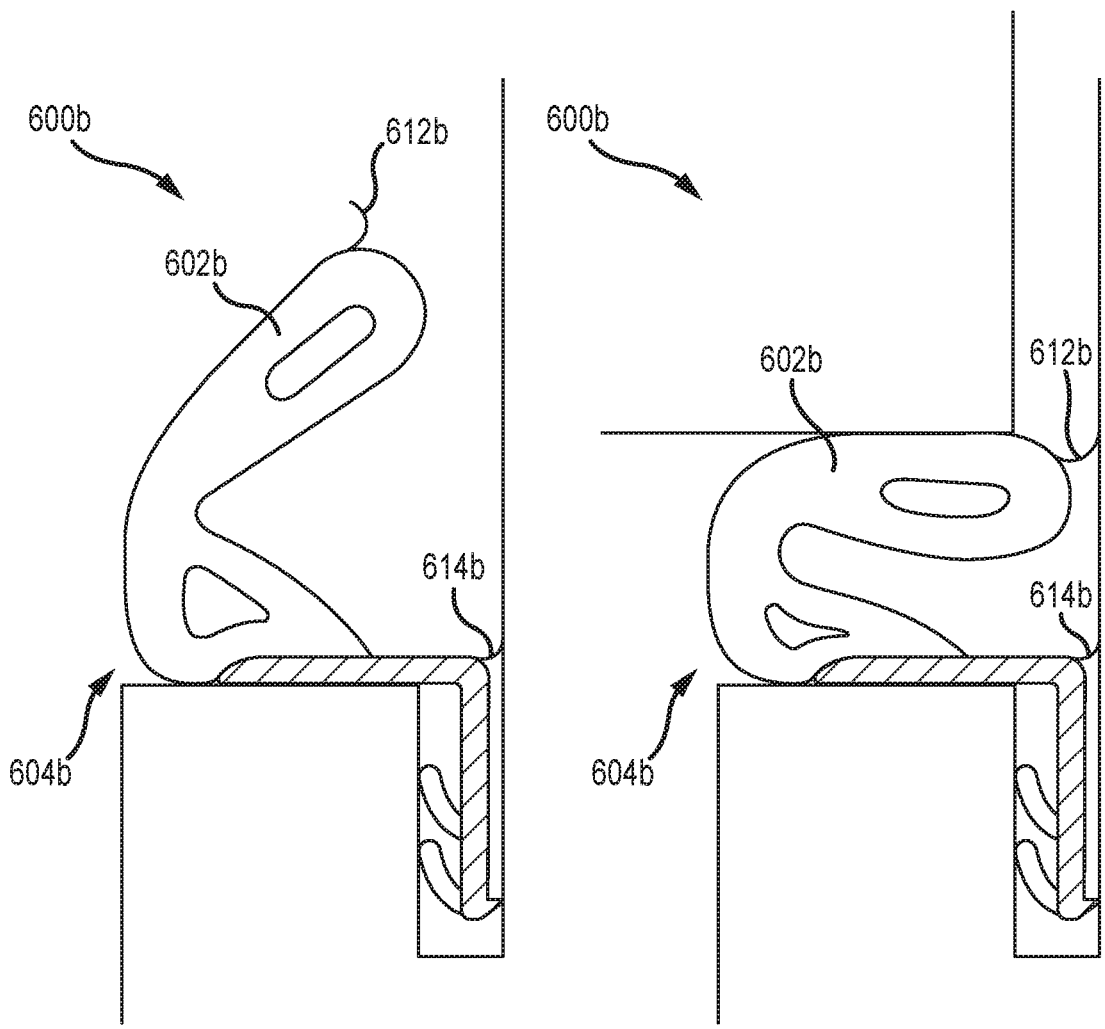

FIGS. 6A-6D depict two examples of weatherseals 600a, 600b and are used to describe, generally, function of the outer resin coating or skin 602a, 602b. The skin 602a, 602b helps resist structural abuse and acts as a bumper against deformation without significantly increasing CLD. Profiles entirely lacking skin may be utilized, but abrasion resistance, water resistance, and UV resistance may be reduced, as these are primarily functions of the skin. FIGS. 6A and 6B depict a profile 604a having a thick skin portion 606a. The thick skin portion 606a located as depicted (e.g., proximate an outer curvature of the profile 604a) provides abrasion resistance against objects that may drag along the profile 604a, such as furniture and so on. The profile 604a also includes an unskinned portion 608a disposed on an inner curvature of the profile 604a. The unskinned portion 608a allows for increased profile 604a compression, since no skin is present to resist. The unskinned portion 608a is substantially aligned with a lumen 610a, which decreases inward compression I of the lumen 610a. Vertical compression V is increased, however, due to the unskinned portion 608a. FIGS. 6C and 6D depict a weatherseal 600b having skin 602b that includes a plurality of projections or fins 612a, 614b. The projections 612a, 614b can be formed integrally with or secured to the skin 602b and are utilized to seal gaps between surfaces, without increasing the overall size of the profile 604b.

The features and components described above in FIGS. 1A-6D can be incorporated into hinged weatherseals so as to achieve desired performance characteristics. In certain examples, lumens may be disposed in one or more of the upper leaf, the lower leaf, or the hinge, depending on the performance required or desired for a particular application. Multiple lumens in a single leaf are also contemplated and the ribs disposed therebetween can increase CLD (as compared to a leaf utilizing a single large lumen). The lumens may be defined by any shape, as required or desired for a particular application. Lumen shapes such as triangular, oval, ovid, bean, tear, etc., may be utilized. Lumen shapes may also be defined by their similarity to letters, such as U, C, D, O, and so on. As described above, particular shapes (e.g., triangular) may display particularly desirable performance, especially when in a configuration where the lumen is nested in a similarly shaped leaf.

Figure 7A:
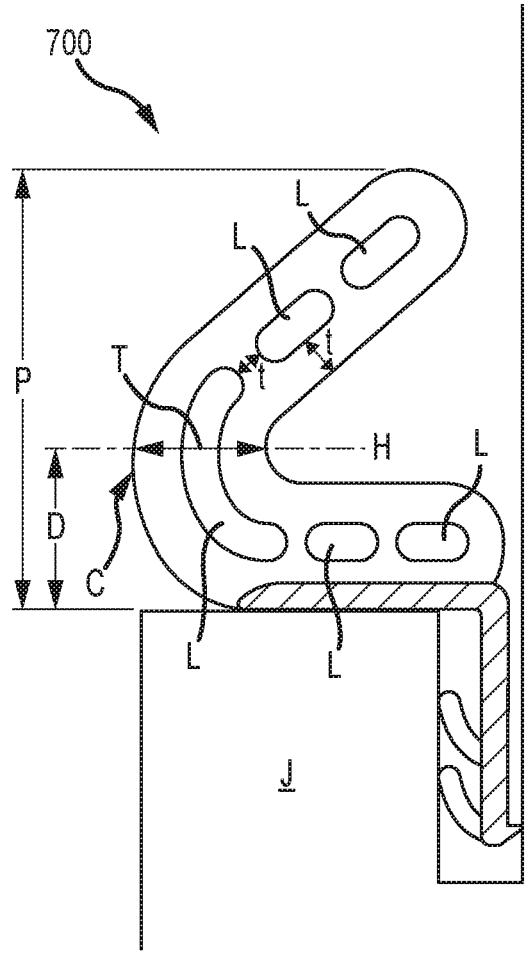
FIGS. 7A and 7B depict an example of a weatherseal in uncompressed and compressed states.
Figure 7B:
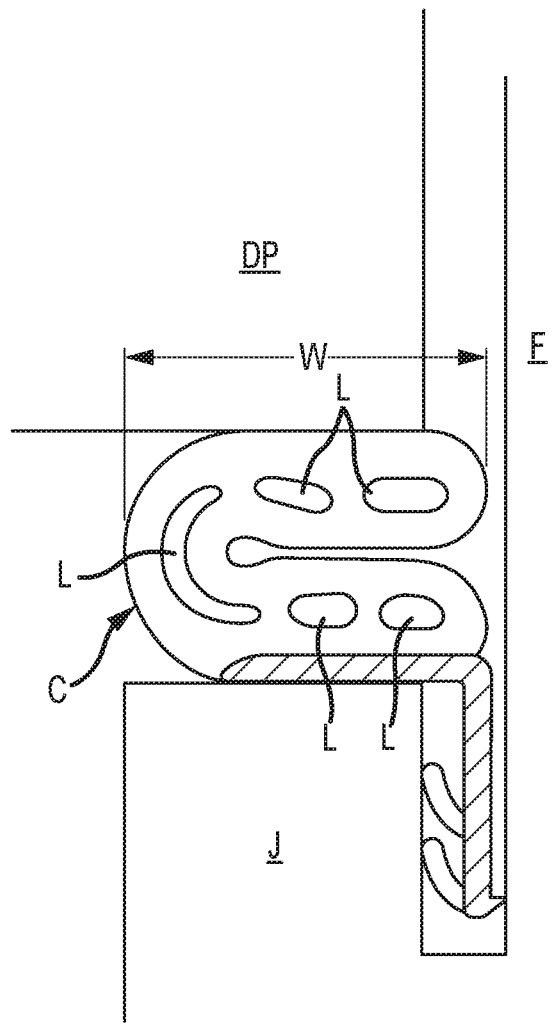

The hinged weatherseals described herein may be utilized in standard entry doors, and as such, may be manufactured to particular sizes and dimensions widely accepted in the industry. FIGS. 7A and 7B depict exemplary dimensions of a weatherseal 700 for illustrative purposes. Individual lengths of weatherseals 700 may be manufactured in elongate lengths, e.g., cut from a single continuous seal. Regardless, each weatherseal defines an elongate axis that extends along a length thereof. As such, lumens defined by the weatherseal profile and similarly elongate along the weatherseal axis. One key feature of the weatherseal 700 is the uncompressed profile height P, which is the distance between a maximum extent of the upper leaf U and the door jamb J. Weatherseals such as those described herein can be manufactured with nominal profile heights P of about two-thirds of an inch to about one inch. More specific examples include heights of about 0.650", about 0.730", about 0.750", about 0.825", and about 0.928". In such examples, the weatherseals may collapse to a height of about half of their uncompressed profile height P, without being subject to overcompression. It is desirable, however, that weatherseals manufactured in accordance with the disclosures herein be completely functional in a range of about one-eighth inch to about one-half inch. In examples, the cross-sectional area of the inner lumens L may decrease to between about 25% to about 50% of their original area when the weatherseal is in the closed position of FIG. 7B. A collapse of about 30% has also been discovered to be acceptable. Such collapsing allows air to be sufficiently evacuated from the lumens, so as to decrease CLD. Upon compression to an overcompressed state (e.g., beyond the compressed state of FIG. 7B), the lumens L may completely collapse, depending on the degree of compression.

Certain ratios of dimensions have been determined to be particularly desirable, as they have a positive effect on performance of the weatherseal 700. For example, a hinge distance D from the jamb J to the hinge H may be about 30% to about 50% of the total profile height P. Hinge distances D in this range have been discovered to result in fairly predictable bending or folding of the hinge H, while ensuring that the outer curvature C remains substantially even with a face of the jamb J (depicted by the dotted line in FIG. 7B) when in the compressed state. Additionally, profile width W should be sized to reduce the possibility of binding (where the upper leaf U is pinched between the door D and the adjacent frame F). This prevents the outer curvature C from being damaged or detracting from the aesthetics of the door panel DP. In other examples, the hinge distance D may be about 40% of the total profile height P. In a weatherseal having a profile height P of about 0.650", this would result in a hinge distance D of about 0.260". Ratios of a hinge thickness T to the profile height P are also relevant, especially in solid hinges, to allow for sufficient recovery. For example, a hinge thickness T of less than about 7% of the profile height H does not recover well, while a hinge thickness T of greater than about 23% displays too much rigidity and resists bending. A hinge thickness T of about 15% of the profile height has been determined to be desirable in certain examples. Wall thickness t (that is, the distance between a lumen L and an outer surface of the profile, as well as the distance between adjacent lumens L) also affects CLD. Depending on the materials used and the manufacturing processes, the wall thickness t may be about 3% of the total profile height P. Wall thickness t as thin as 0.020" are contemplated and have displayed desirable results.

The weatherseals described herein may be manufactured in accordance with processes now known or developed in the future. Profiles may be cut from extruded, cooled pieces of foam material utilizing laser cutting processes, hot wire cutting processes, or other processes. The weatherseals may be cut from a rotary blade and formed into a final shape. For example, the weatherseal may be slit open, machined with a high speed cutter to form the lumen, coated to seal the exposed ends, then mounted to a substrate. Flexible adhesive systems can be used to assemble segments in a clamshell configuration by passing two elongated machined strips of foam over an adhesive lick roll and joining the strips together, thus forming the lumens. Other methods of manufacture include laminating multiple elongates subcomponent foam rod-shaped extrusions into a shape with a set of guides and rollers using a combination of heat and coating materials. Small foam beads or assembled tubes with cellular walls may be fused together in a continuous shape. The weatherstrip or portions thereof may be 3D printed with a modified Stratasys or similar printer. Lumens formed within the profiles may be cut by similar technologies, or may be machined or otherwise formed in the profiles utilizing, e.g., elongate drilling bits or other machining tools.

Desirable manufacturing processes also include extrusion and co-extrusion processes, such as those described in U.S. Pat. Nos. 5,607,629; 5,393,796, and 5,192,586, the disclosures of which are hereby incorporated by reference herein in their entireties. U.S. Pat. No. 7,718,251 also describes fabric-clad foam weatherseals, and such technologies may also be incorporated into the hinged, hollow profile technologies described herein. Electrical discharge machining (EDM) methods and design innovations have led to production of extrusion dies and back plates that may be used to produce complex profiles having one or more lumens, varied skin thicknesses, and other features. Very thin die openings with very delicate mandrel spider leg supports allow for unique foam shape control for very thin outer and inner reinforcing walls. Thin die openings also allow the foam to "knit" back together, creating a seamless finished product. The thin dies also allow a shape to maintain an inflated structure with an inner network of inner reinforcing walls or ribs, thus providing a process to design and produce, e.g., very large, complex multi-hollow foam profiles. Back-plates can be used that approximate the shape of the profile and guide the melt in a predetermined manner toward specific areas of the front plate.

The dies may be used to produce profiles having walls only three cells thick in certain locations. TPE foam cells vary from 0.010"-0.050" diameter, depending on the polymer composition and the operating parameters. The cells are somewhat interactive with adjacent cells via random openings in their walls, allowing a restricted flow of air through the cell matrix. This allows air to be evacuated upon foam compression and to be returned to the cell matrix upon de-compression. The dies provide good shape control since the cells expand laterally, with minimal distortion, and allow for precise flexibility in areas designed to be hinges. Thin internal walls may need smaller cell structure with lower porosity in order to limit internal off-gassing while achieving low densities. Internal off-gassing inflates and distends lumens and can be controlled during the cooling process. Further development and control of foam cell size and density through process controls, base material changes, and additives may control rate of off-gassing during cell formation.

Materials utilized in the manufacture of the described weatherseals are identified in U.S. Pat. Nos. 5,607,629; 5,393,796; and 5,192,586, the disclosures of which are hereby incorporated by reference herein in their entireties. Materials also include SANTOPRENE®, manufactured by the ExxonMobil Corporation; Sarlink manufactured by Teknor Apex Company; and Elastron Thermoplastic Elastomers, manufactured by Elastron Kimya A.S. Thermoset components may be applied during manufacture to improve compression set resistance. Lumens may also be formed in EPDM or urethane profiles.

A number of example weatherseals incorporating certain technologies described herein, are depicted below. In general, all of the following examples include a profile, a stiffener, an outer skin or resin coating, upper and lower leaves integral with each other (e.g., joined at a hinge), and one or more lumens in various locations. Further details regarding certain of these aspects for particular examples are described further below. A person of skill in the art, upon reading the above disclosure and following examples, will be able to produce further differing examples.

Example 1

FIGS. 8A-8B depict a first example of a weatherseal W1 incorporating certain of the technologies described herein, in uncompressed and compressed states, respectively. The weatherseal W1 includes a U-shaped profile curve PC1 and five lumens 1-5. Lumen 3 is disposed at the hinge H1, thus, the hinge H1 is a hollow type. The large curved lumen 3 adjacent to the hinge H1 reduces the CLD while the two pairs of lumens 1-2 (in an upper leaf U1) and 4-5 (in a lower leaf L1) further reduce the CLD while providing free flowing drainage, thus preventing accumulation of water. The single rib R1 within each leaf U1, L1 acts as a reinforcing structure to maintain product shape as well as a cushion to absorb impact.

Example 2

Figure 9A:
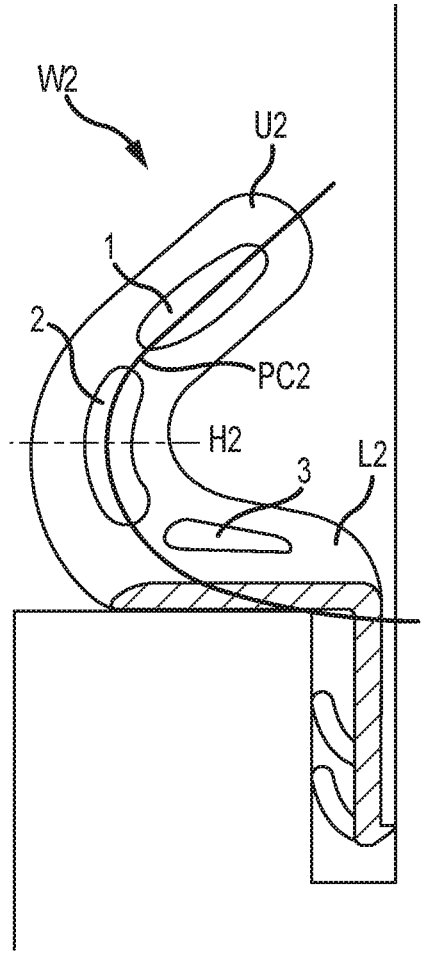
Figure 9B:
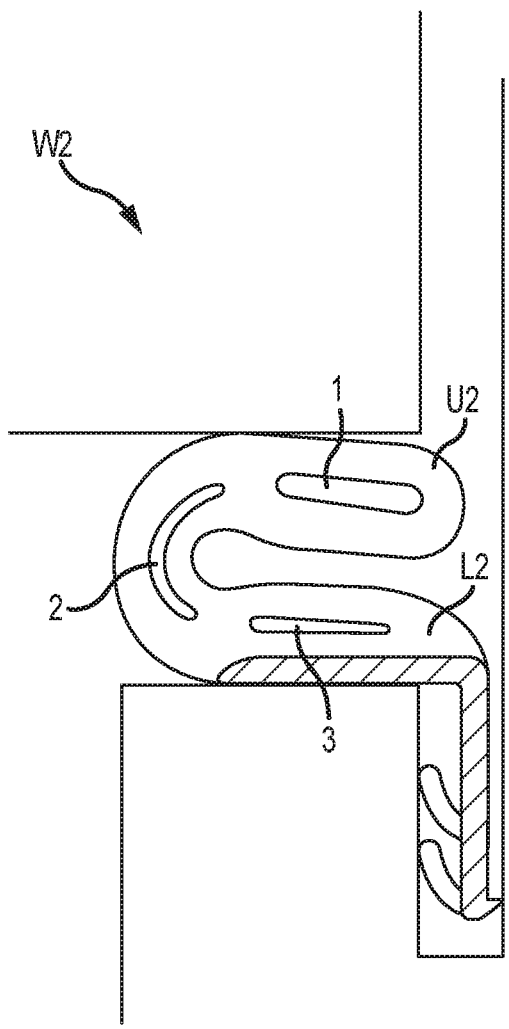

FIGS. 9A-9B depict a second example of a weatherseal W2 incorporating certain of the technologies described herein, in uncompressed and compressed states, respectively. The weatherseal W2 includes a U-shaped profile curve PC2 and three lumens 1-3. The weatherseal W2 is a similar hinge configuration to EXAMPLE 1, but also includes a single lumen 1, 3 in each leaf U2, L2. These lumens 1, 3, provide a lower CLD when the weatherseal W2 is overcompressed, as when a door is mounted out-of-plumb or hardware is mounted so as to compress the weatherseal W2 to less than a designed gap (e.g., ⅜"). While in the closed position in a door gap, the hinge H2 deforms such that the outer layer of foam remains under tension and the inner layer remains under compression, as described above for hollow hinges. As the weatherseal W2 is compressed, the lumen 2 is collapsed and the forces are distributed over a wide area, creating an acceptable balance between low CLD and good recovery.

Example 3

Figure 10A:
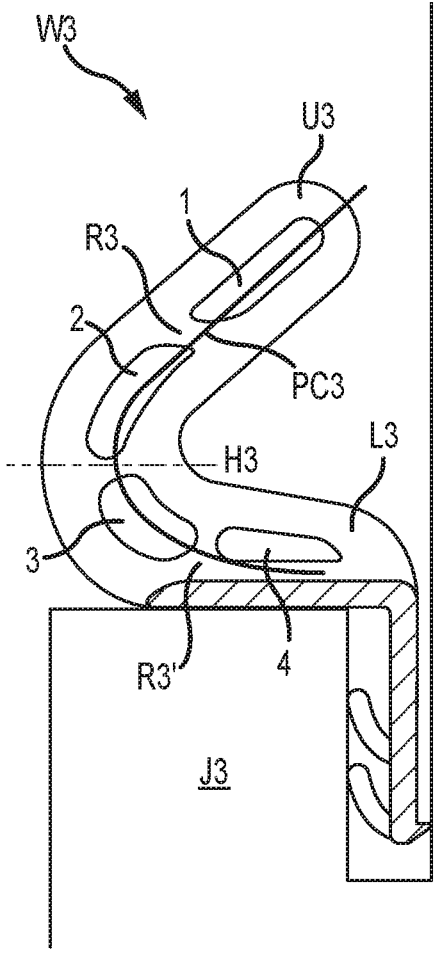
Figure 10B:
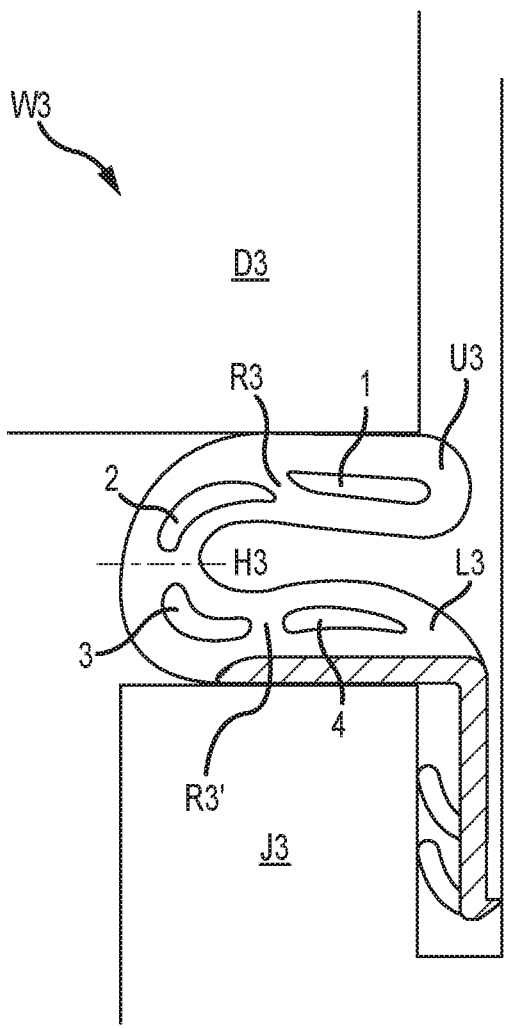

FIGS. 10A-10B depict a third example of a weatherseal W3 incorporating certain of the technologies described herein, in uncompressed and compressed states, respectively. The weatherseal W3 includes a U-shaped profile curve PC3 and four lumens 1-4. Rib R3 in the upper leaf U3 is disposed at an angle to the jamb J3 and door D3, which causes tension and compression forces, as described above, during closing operations and overcompression. Rib R3', on the other hand, is substantially orthogonal to the jamb J3 and door D3, providing impact resistance during overcompression. Hinge H3 is solid, and the lumens 2, 3 disposed proximate thereto deform significantly during bending. Due to the angled rib R3, this causes significant deformation of lumen 1. The orthongal rib R3' limits significant deformation of the lumen 4, until overcompression occurs.

Example 4

Figure 11A:
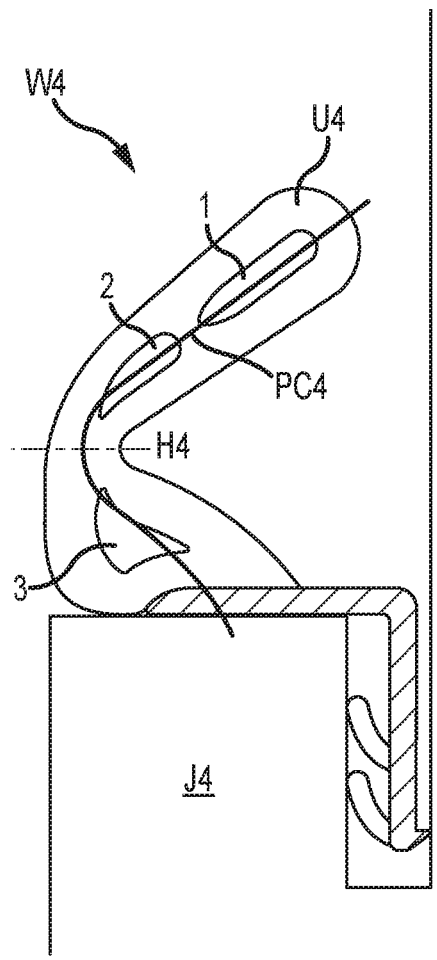
Figure 11B:
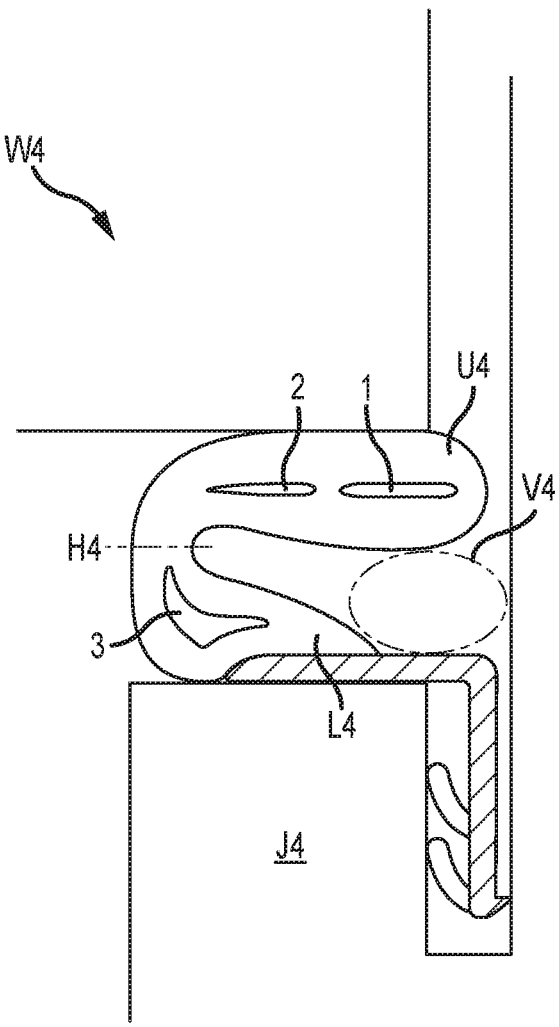

FIGS. 11A-11B depict a fourth example of a weatherseal W4 incorporating certain of the technologies described herein, in uncompressed and compressed states, respectively. The weatherseal W4 includes a V-shaped profile curve PC4 and three lumens 1-3. The weatherseal W4 includes a narrow, solid hinge H4, a triangular lower leaf L4, and an outer flexible skin S4 that mounts flush to the jamb J4. This allows the flexible skin S4 to seal tight against the jamb J4 thereby creating a positive seal. The solid hinge H4 provides a solid volume of foam to compress. This distributes the deformation forces above and below the hinge H4, providing a larger volume of foam compression while maintaining an acceptable balance between CLD and recovery. The triangular lumen 3 is nested within the lower leaf L4. As such, its sides are substantially parallel with, and disposed a consistent distance d from the outer surface of the lower leaf L4. Thus, the lumen 3 deforms in a unique manner, folding and buckling B as the weatherseal W4 is compressed into the compressed state of FIG. 11B. This buckling B enhances the low CLD. Additionally, the configuration of the lower leaf L4 also results in the presence of an overcompression volume V4, into which the upper leaf U4 may be moved, should overcompression occur.

Example 5

Figure 12A:
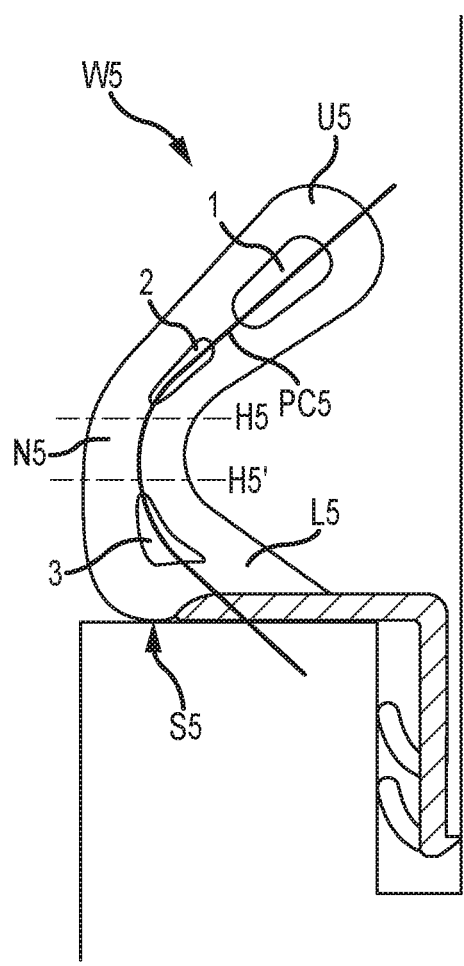
Figure 12B:
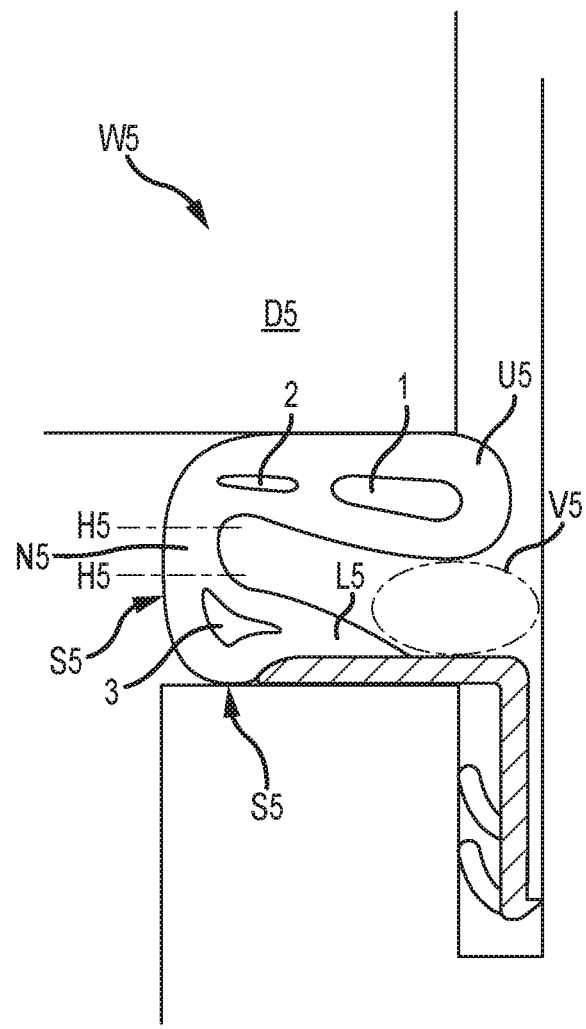

FIGS. 12A-12B depict a fifth example of a weatherseal W5 incorporating certain of the technologies described herein, in uncompressed and compressed states, respectively. The weatherseal W5 includes a profile curve PC5 defined by a central linear neck section N5 that is bounded by two hinges H5, H5'. Three lumens 1-3 are present. The two hinges H5, H5' provide secondary relief when the door D5 is closed. On the hinge side of the door D5, the upper hinge H5 bends, after which the lower hinge H5' becomes the active hinge point. On the lock side of the door D5, the upper hinge H5 becomes active as the door D5 closes in a straight downward fashion. An additional feature is a thickened, heavily reinforced outer skin S5 on the lower and side surfaces of the lower leaf L5. These surfaces S5 remain exposed to ambient conditions when the door D5 is closed and exposed to structural abuse when the door D5 is open, during such times as when furniture or other large objects are being moved through the doorway. The thicker skin surface S5 acts as a "bumper" while it does not significantly detract from the desired low CLD. Additionally, the configuration of the lower leaf L5 also results in the presence of an overcompression volume V5, into which the upper leaf U5 may be moved, should overcompression occur.

Example 6

Figure 13A:
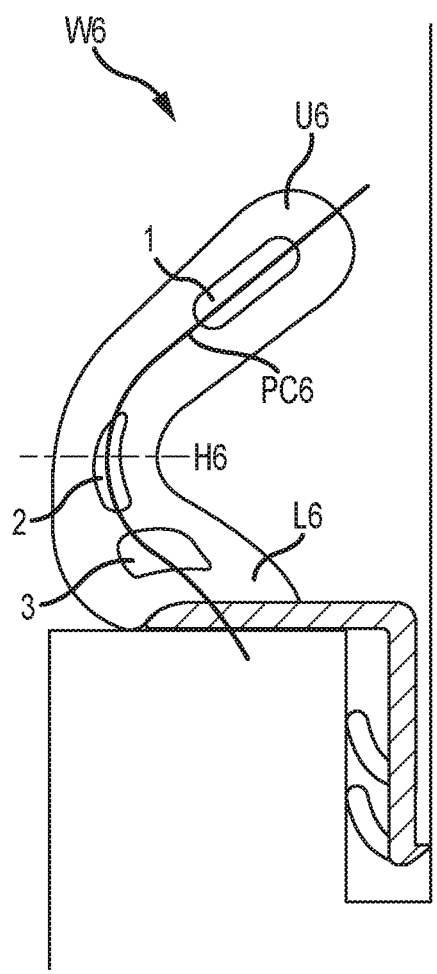
Figure 13B:
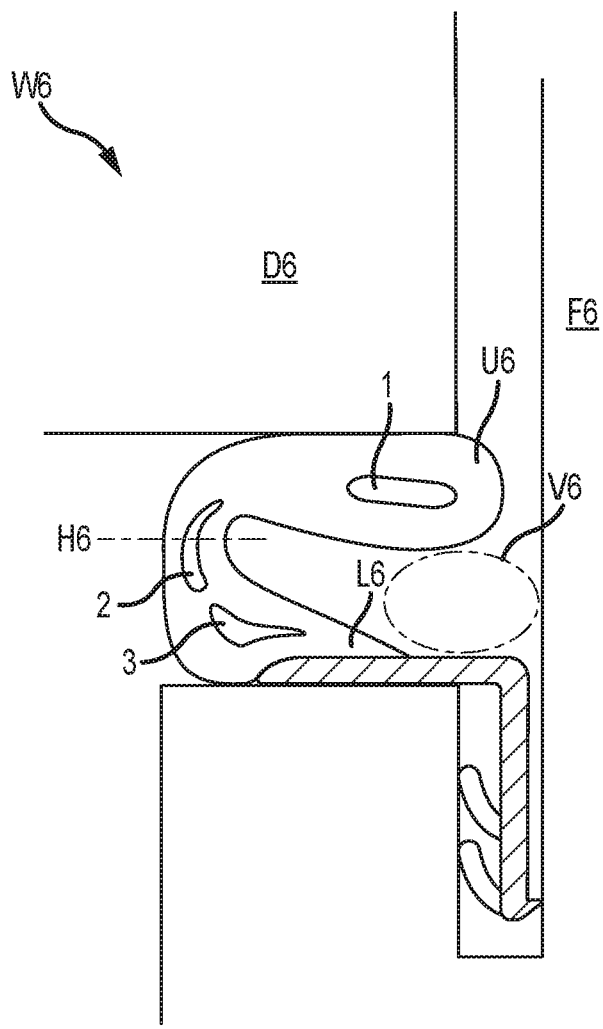

FIGS. 13A-13B depict a sixth example of a weatherseal W6 incorporating certain of the technologies described herein, in uncompressed and compressed states, respectively. The weatherseal W6 includes a U-shaped profile curve PC6 and three lumens 1-3. The weatherseal W6 includes a small crescent shaped lumen 2 at the hinge H6 designed to minimize the CLD, accompanied by a relatively stiff upper leaf U6 that is designed to fold in a uniform manner, driving the majority of the folding and deformation into the lower leaf L6 of the weatherseal W6. The upper leaf U6 is fairly stiff because the lumen 1 is formed in only a small portion thereof. As such, the hinge H6 flexes more precisely, protecting and sealing the full gap from the frame F6 to the door D6. Additionally, the configuration of the lower leaf L6 also results in the presence of an overcompression volume V6, into which the upper leaf U6 may be moved, should overcompression occur.

Example 7

Figure 14A:
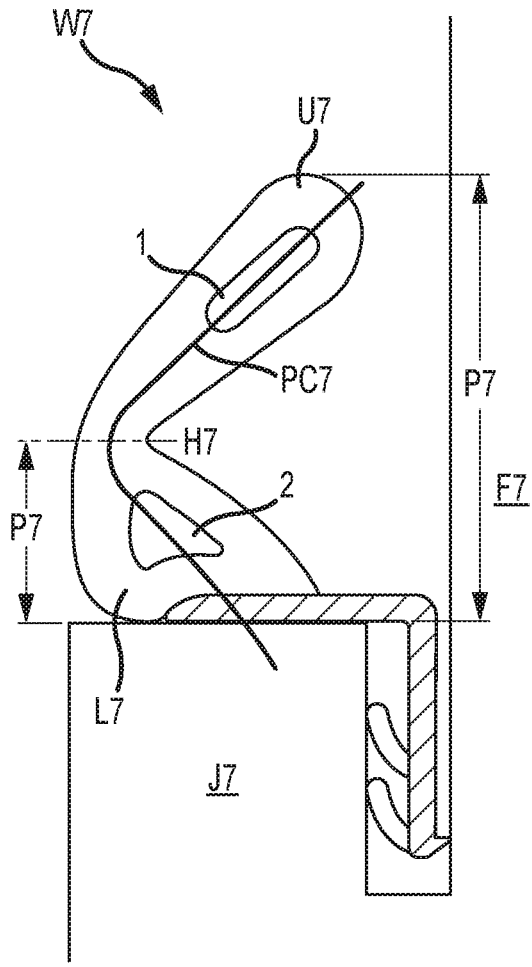
Figure 14B:
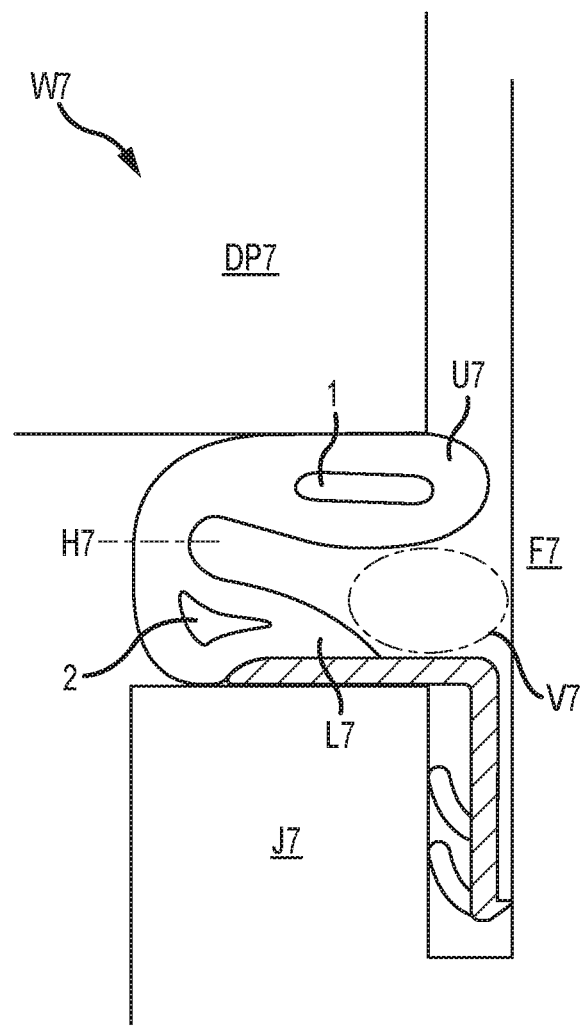
Figure 15A:
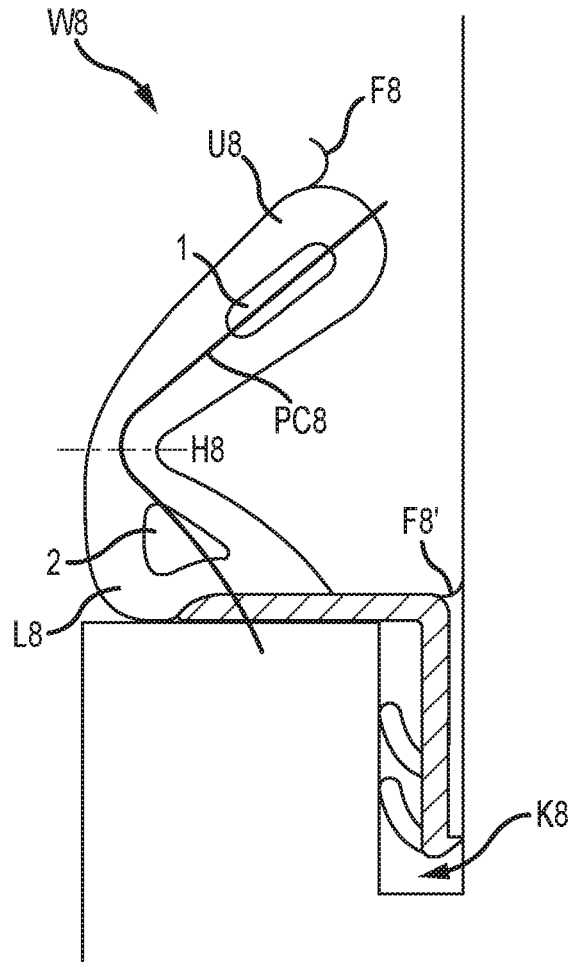
Figure 15B:
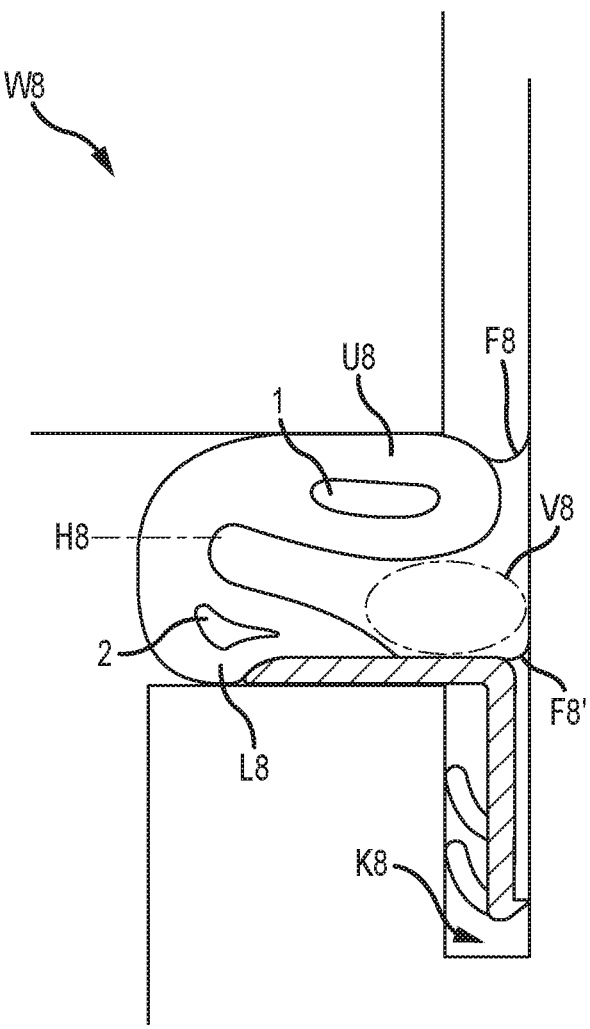

FIGS. 14A-14B depict a seventh example of a weatherseal W7 incorporating certain of the technologies described herein, in uncompressed and compressed states, respectively. The weatherseal W7 includes a V-shaped profile curve PC7 and two lumens 1-2. The weatherseal W7 relies upon a very narrow hinge H7 located at a distance D7 approximately 0.230" above the jamb J7. As such, the hinge H7 is located at about 40% of the profile height P7. The weatherseal W7 includes a triangular lower leaf L7 having a nested triangular lumen 2 that accommodates the compression deformation caused by door DP7 closing. The upper lumen 1 provides relief from overcompression or in the event that the tip of the upper leaf U7 gets caught between the door DP7 and the door frame F7. An overcompression volume V7 is also present.

Example 8

FIGS. 14A-14B depict a eighth example of a weatherseal W8 incorporating certain of the technologies described herein, in uncompressed and compressed states, respectively. The weatherseal W8 is of the same design with many of the same features as weatherseal W7. As such, components shared with that of weatherseal W7 are not described further. Weatherseal W8, however, includes a sealing feature enhancement of two sealing fins F8, F8'. Sealing fin F8 is disposed at the tip of the upper leaf U8 and reduces or eliminates the penetration of air and water. Sealing fin F8' is disposed at the point of entrance to the saw kerf K8 that is designed and constructed as a receiving channel for mounting the weatherseal W8. This sealing fin F8' can limit infiltration of water into the kerf K8.

Example 9

Figure 16A:
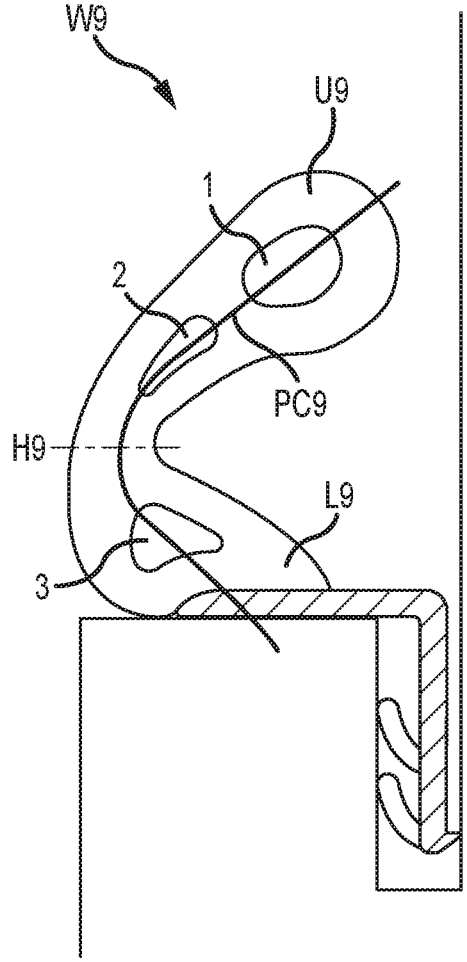
Figure 16B:
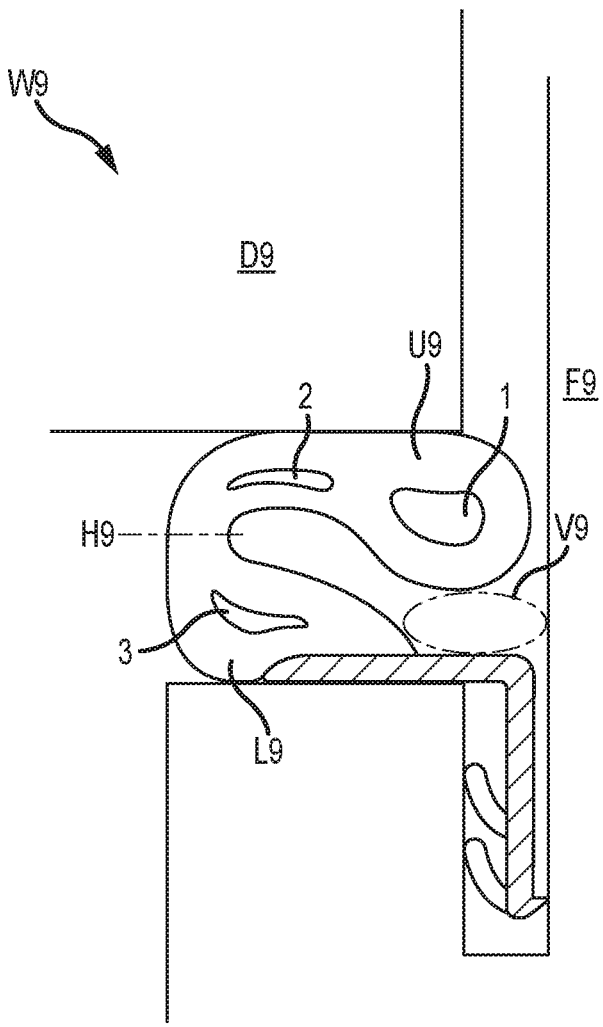

FIGS. 16A-16B depict a ninth example of a weatherseal W9 incorporating certain of the technologies described herein, in uncompressed and compressed states, respectively. The weatherseal W9 includes a U-shaped profile curve PC9 and three lumens 1-3. The upper leaf U9 is in the form of an inward-facing bulbous lobe that extends into the overcompression volume V9 so as to effectively seal the space between the door D9 and the frame F9 in the closed position. It also provides an effective cushion in the event of over compression or door slamming. The hinge H9 is relatively solid and the lower leaf L9 is triangular with a nested triangle lumen 3.

Example 10

Figure 17A:
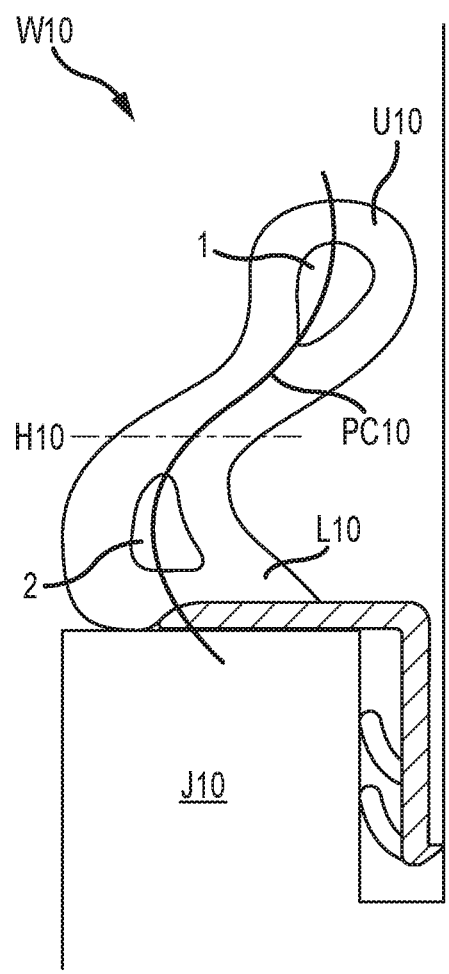
Figure 17B:
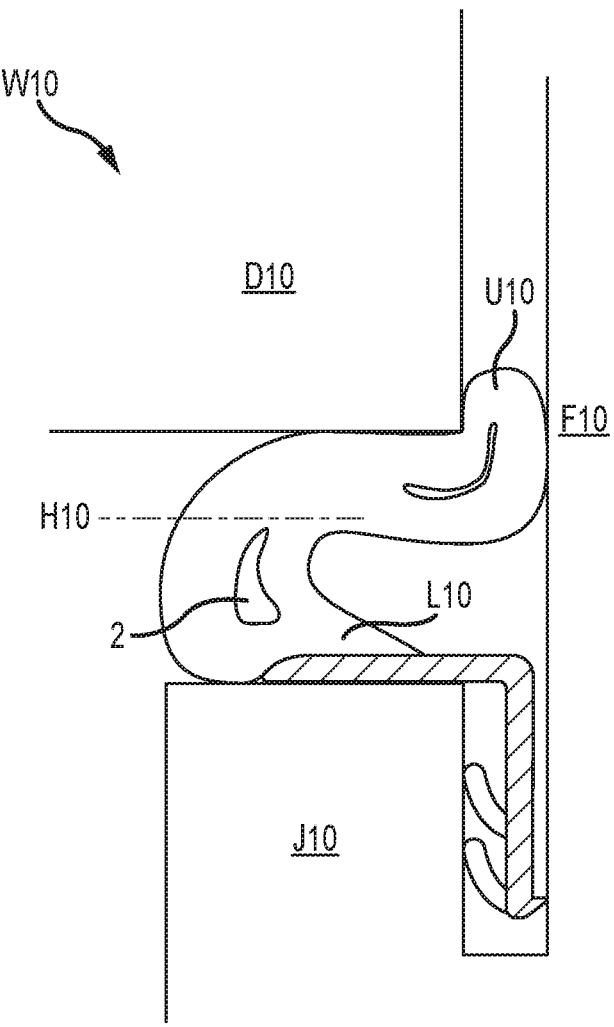

FIGS. 17A-17B depict a tenth example of a weatherseal W10 incorporating certain of the technologies described herein, in uncompressed and compressed states, respectively. The weatherseal W10 includes an S-shaped profile curve PC10, two lumens 1-2, and a solid hinge H10. The upper leaf U10 is in the form of an outwardly-facing bulb and includes a lumen 1 that allows the tip of the upper leaf U10 to be compressed between the door D10 and the frame F10. This creates a superior seal to prevent penetration of air and water through the door gap. The triangular lower leaf L10 allows ease of compression to less than 1 pound per foot at the required gap (e.g., ⅜" nominal).

Example 11

Figure 18A:
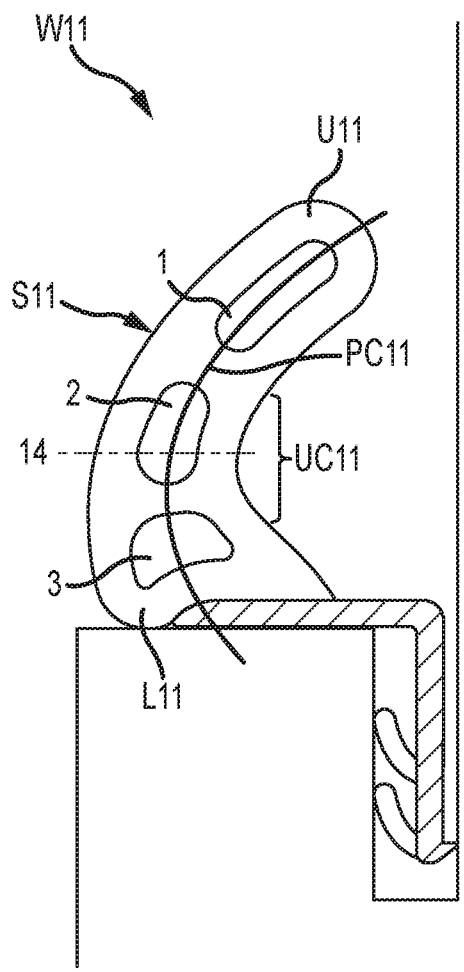
Figure 18B:
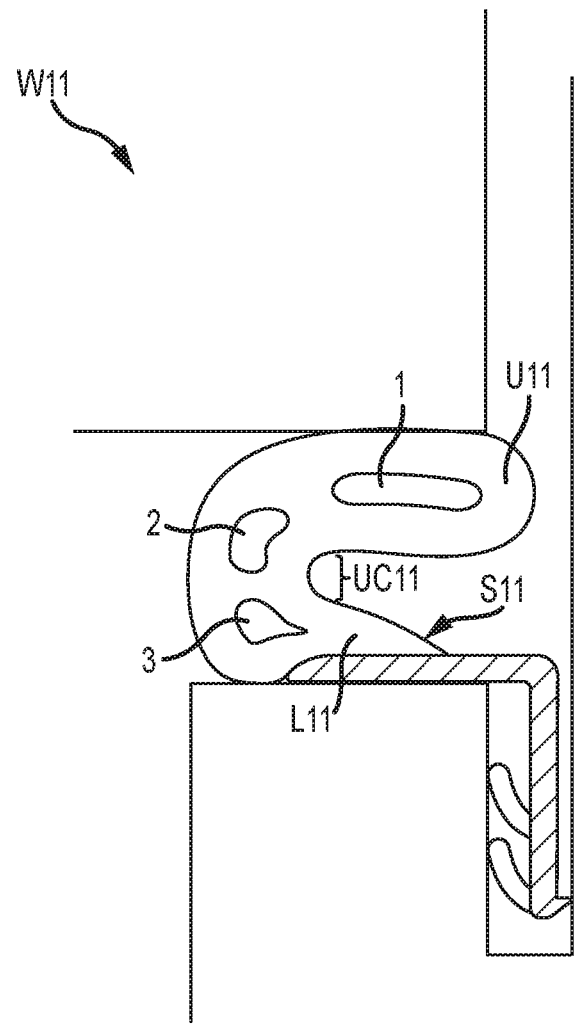

FIGS. 18A-18B depict a eleventh example of a weatherseal W11 incorporating certain of the technologies described herein, in uncompressed and compressed states, respectively. The weatherseal W11 includes a U-shaped profile curve PC11, three lumens 1-3, and a hollow hinge H11. In order to reduce the CLD to 0.6 pounds per foot or less deflected to a ⅜" gap, the weatherseal W11 features an uncoated portion UC11 at an interior curve of the weatherseal W11. This uncoated portion UC11 allows for ease of foam compression without the resistance of the flexible skin layer 511. In combination with the lumen 2 at the hinge H11, the profile is allowed to compress in two planes: inward to collapse the hollow and vertically above the jamb J11. This action reduces CLD and aids recovery.

Example 12

Figure 19:
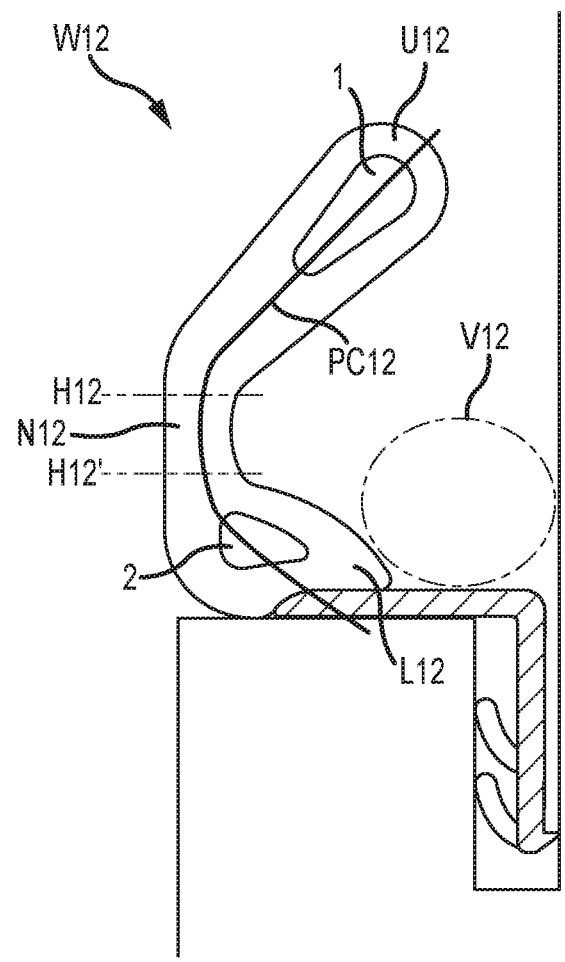

FIG. 19 depicts a twelfth example of a weatherseal W12 incorporating certain of the technologies described herein, in an uncompressed state. The weatherseal W12 includes a profile curve PC12 defined by a central linear neck section N12 that is bounded by two hinges H12, H12'. Two lumens 1-2 are present. The two hinges H12, H12' provide secondary relief when the door is closed. On the hinge side of the door, the upper hinge H12 bends, after which the lower hinge H12' becomes the active hinge point. On the lock side of the door, the upper hinge H12 becomes active as the door D12 closes in a straight downward fashion. The weatherseal W12 will provide extra protection for non-standard installations (e.g., a larger 0.750" thick version of the seal) while maintaining the same low CLD at less than 1 pound at ⅜" closed gap. An overcompression volume V12 is also present.

Example 13

Figure 20:
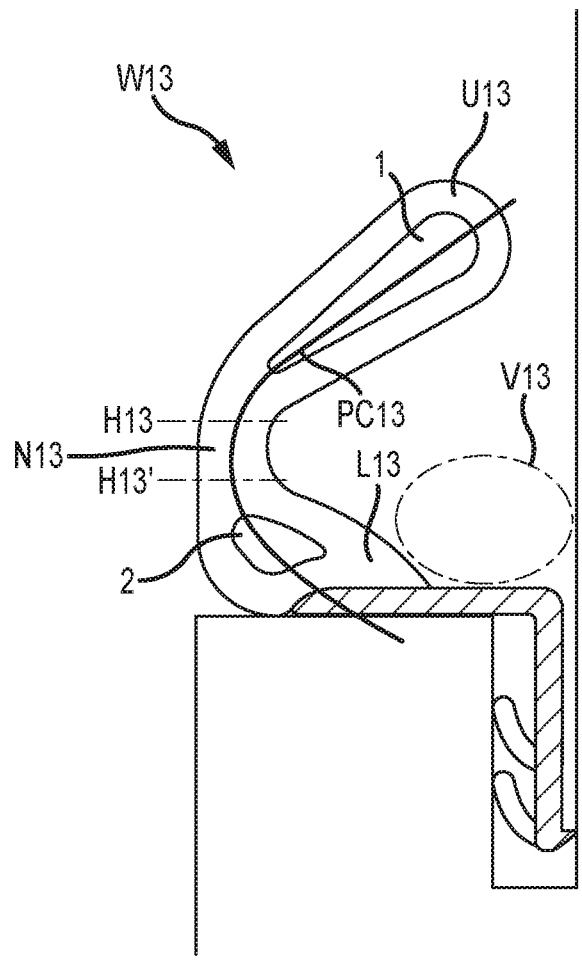

FIG. 20 depicts a thirteenth example of a weatherseal W13 incorporating certain of the technologies described herein, in an uncompressed state. The weatherseal W13 includes a profile curve PC13 defined a central linear neck section N13 that is bounded by two hinges H13, H13'. Two lumens 1-2 are present. The two hinges H13, H13' provide secondary relief when the door is closed. On the hinge side of the door, the upper hinge H13 bends, after which the lower hinge H13' becomes the active hinge point. On the lock side of the door, the upper hinge H13 becomes active as the door closes in a straight downward fashion. The large size of lumen 1 forms a highly conformable upper leaf U13. As the weatherseal W13 is compressed, the upper leaf U13 rotates into the closed position, reducing the need for the upper leaf U13 tip to drag across the surface of the door D13 on the lock side of the door. An overcompression volume V13 is also present.

Select Test Data

As described above, it is desirable that the TPE foam weatherseals described herein display performance similar to urethane foam weatherseals. Table 1 depicts results of Door Closing Force tests and compares a number of different products. Q-lon is a urethane weatherseal manufactured by Schlegel of Rochester, N.Y. FOAM-TITE™ is a foam TPE weatherseal manufactured by Amesbury Group, Inc., of Amesbury, Mass. These two products were tested and the performance was compared to a foamed TPE weatherseal consistent with EXAMPLE 7, above. As can be seen, the EXAMPLE 7 product has a lower closing force than the Q-lon product and significantly lower closing force than the Foam-Tite product, which is manufactured from a like TPE material. As such, the EXAMPLE 7 product displays very desirable performance properties.

TABLE 1

| Door Closing Force Test Comparison Door Closing Force | | | | | | |
|---|---|---|---|---|---|---|
| Class | Test Specimen | Nominal Height | Door Closing Force | Compared to OEM Seal | Lab Test Lbs/Ft CLD | Comment |
| Q-Lon | QEBD-650 | 0.650 | 13.2 | 100% | 1.23 | Newly installed seals |
| Q-Lon | QEBD-650 | 0.650 | 9.5 | 72% | 0.97 | 24 hours after installation |
| TPE | Ex. 7 | 0.650 | 11.3 | 86% | 1.08 | Newly installed seals |

TABLE 1-continued

Door Closing Force Test Comparison
Door Closing Force

| Class | Test Specimen | Nominal Height | Door Closing Force | Compared to OEM Seal | Lab Test Lbs/Ft CLD | Comment |
|---|---|---|---|---|---|---|
| TPE | Ex. 7 | 0.650 | 8.0 | 61% | 0.92 | 24 hours after installation |
| Foam-Tite ™ | 12083 | 0.625 | 26.8 | 204% | 3.40 | Standard .625 production run |
| Foam-Tite ™ | 12001 | 0.650 | 34.3 | 261% | 4.70 | Standard .650 production run |

Table 2 depicts various performance data for a foamed TPE weatherseal consistent with EXAMPLE 7 above, as compared to two Q-lon products. The data includes weatherseal reach, force to close, air leakage, and water penetration, before and after 250,000 cycles. The data indicates that the EXAMPLE 7 product displays desirable force to close and reach, even after the test cycles are performed. The weatherseal also passes both the air leakage and water penetration tests, consistent with the Q-lon products.

TABLE 2

Performance Data Test Comparison
SINGLE OUTSWING DOOR (before and after 250k door cycles)

| | | | Weatherseal | |
|---|---|---|---|---|
| Test | Units | | U71 Q-Lon | EX. 7 |
| Weatherseal reach | inch | before after | 0.636 +/− 0.012 0.621 +/− 0.011 | 0.654 +/− 0.018 0.607 +/− 0.023 |
| Force to Latch | lbs | before after | 2.74 +/− 0.11 2.33 +/− 0.09 | 2.42 +/− 0.11 2.41 +/− 0.13 |
| ASTM E283 Air Leakage | scfm/ft2 | before after | Pass Pass | Pass Pass |
| ASTM E547 Cyclic water penetration | design pressure, psf | before after | Pass Pass | Pass Pass |

Table 3 depicts door seal CLD test data for Q-lon products, a FOAM-TITE™ product, and a number of examples of the above described low-CLD foam TPE products (specifically, EXAMPLES 4, 5, 7, and 10). CLD is measured for a newly-manufactured product. CLD is measured by compressing a 1" sample of the tested weatherstrip having a nominal height of 0.650". The weatherstrip is compressed at a compression rate of 1"/minute until compression of ⅜" is reached. The compression is performed with a CHATTILON force gauge. Under such test conditions, a CLD of less than about 1.25 lb/ft of weatherstrip would be desirable. As can be seen, the tested samples consistent with EXAMPLES 4, 5, 7, and 10 display lower CLDs than the comparably sized Q-lon products. The FOAM-TITE™ weatherstrip without lumens displays a very high CLD.

TABLE 3

Door Seal CLD Test Comparison

| Sample | Compression Force lb/ft |
|---|---|
| QEBD 650 U71 Q-Lon | 1.33 |
| Foam-Tite ™ 12083 | 2.79 |
| EXAMPLE 4 | 1.03 |
| EXAMPLE 5 | 1.05 |
| EXAMPLE 7 | 1.12 |
| EXAMPLE 10 | 1.08 |

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A weatherseal comprising:
   a stiffener configured to be inserted into a kerf of a doorframe; and
   a foam profile comprising:
      a first profile portion connected to the stiffener;
      a second profile portion comprising a tip;
      an elongate section extending between the first profile portion and the second profile portion;
      two hinges bounding the elongate section, wherein a first hinge is formed between the first profile portion and one end of the elongate section and a second hinge is formed between the second profile portion and the other end of the elongate section, wherein the first hinge and the second hinge each define a portion of the foam profile that bends when the tip of the second profile portion is acted upon by an external force, and wherein each hinge has a first portion of foam material that is under compression and a second portion of foam material that is under tension during bending; and
      an inner surface and an opposite outer surface, wherein when the foam profile bends, the inner surface is under compression and the outer surface is under tension, and wherein when each hinge bends, the first portion of foam material is proximate the inner surface and the second portion of foam material is proximate the outer surface.

2. The weatherseal of claim 1, wherein when the foam profile is in an uncompressed position, the second profile portion is disposed at an acute angle to the first profile portion.

3. The weatherseal of claim 1, wherein upon application of the external force to the tip of the second profile portion, the second hinge bends prior to the first hinge.

4. The weatherseal of claim 1, wherein the stiffener comprises a first leg and a second leg, wherein the first leg is connected to the first profile portion.

5. The weatherseal of claim 4, wherein the elongate section defines a longitudinal axis, and wherein the longitudinal axis is substantially orthogonal to the first leg of the stiffener.

6. The weatherseal of claim 4, wherein the first profile portion is connected to the first leg along substantially all of a width of the first leg.

7. The weatherseal of claim 1, wherein the weatherseal further comprises a resin coating at least a portion of the outer surface.

8. The weatherseal of claim 7, wherein the resin coating on the first profile portion is reinforced.

9. The weatherseal of claim 1, wherein the first profile portion has a cross-sectional shape different than a cross-sectional shape of the second profile portion.

10. The weatherseal of claim 1, wherein at least one of the first profile portion and the second profile portion defines a lumen.

11. The weatherseal of claim 1, wherein the first profile portion defines a first lumen, and wherein the second profile portion defines at least one second lumen.

12. The weatherseal of claim 1, wherein the foam profile comprises a closed-cell foam.

13. The weatherseal of claim 12, wherein the closed-cell foam is thermoplastic elastomer (TPE).

14. The weatherseal of claim 12, wherein the closed-cell foam is ethylene propylene diene monomer (EPDM).

15. The weatherseal of claim 1, wherein the foam profile comprises a compression load deflection of less than about 1.25 pounds per foot, when compressed to a thickness of about 3/8 inch at a rate of about 1 inch/minute.

16. The weatherseal of claim 1, wherein the stiffener is substantially rigid.

17. The weatherseal of claim 1, wherein when the foam profile is in a compressed position, an overcompression volume is defined between the first profile portion and the second profile portion.

18. The weatherseal of claim 17, wherein when the foam profile is in an overcompressed position, the second profile portion is disposed at least partially within the overcompression volume.

19. The weatherseal of claim 1, wherein a lumen is defined within the elongate section.

20. The weatherseal of claim 1, wherein the weatherseal is configured to resist water penetration.

* * * * *